US008966280B2

(12) United States Patent
Aono

(10) Patent No.: US 8,966,280 B2
(45) Date of Patent: Feb. 24, 2015

(54) STORAGE DEVICE, MEMORY DEVICE, CONTROL DEVICE, AND METHOD FOR CONTROLLING MEMORY DEVICE

(75) Inventor: Yoshihisa Aono, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 277 days.

(21) Appl. No.: 13/239,682

(22) Filed: Sep. 22, 2011

(65) Prior Publication Data

US 2012/0124391 A1    May 17, 2012

(30) Foreign Application Priority Data

Nov. 11, 2010   (JP) ................................. 2010-252623

(51) Int. Cl.
     *G06F 21/00*      (2013.01)
     *G06F 21/80*      (2013.01)

(52) U.S. Cl.
     CPC ...................................... *G06F 21/80* (2013.01)
     USPC ............................................ 713/189; 726/27

(58) Field of Classification Search
None
See application file for complete search history.

(56) References Cited

U.S. PATENT DOCUMENTS

| | | | |
|---|---|---|---|
| 7,506,008 B2* | 3/2009 | Yamamoto | 1/1 |
| 8,239,690 B2* | 8/2012 | Funahashi | 713/193 |
| 2008/0104396 A1* | 5/2008 | Sato et al. | 713/168 |
| 2010/0205425 A1* | 8/2010 | Takacs et al. | 713/193 |

FOREIGN PATENT DOCUMENTS

JP      06-102956 A      4/1994

* cited by examiner

*Primary Examiner* — Gilberto Barron, Jr.
*Assistant Examiner* — Simon Kanaan
(74) *Attorney, Agent, or Firm* — Fujitsu Patent Center

(57) ABSTRACT

A storage device includes a storage unit and a controller that controls the storage unit in accordance with a request provided from an upstream-side device. The storage unit includes a storage medium that stores data, an authentication processing unit that performs an authentication process, and a storage region managing unit that sets either a first region or a second region in a storage region. The first region is accessible and useable to perform data reading and data writing between the upstream-side device and the storage unit when the access authentication is successfully performed on the basis of a first password. The second region may be released when the access authentication is successfully performed on the basis of a second password. When the storage unit needs to be disconnected, the controller sets the second region in the storage region in which the first region has been previously set.

1 Claim, 18 Drawing Sheets

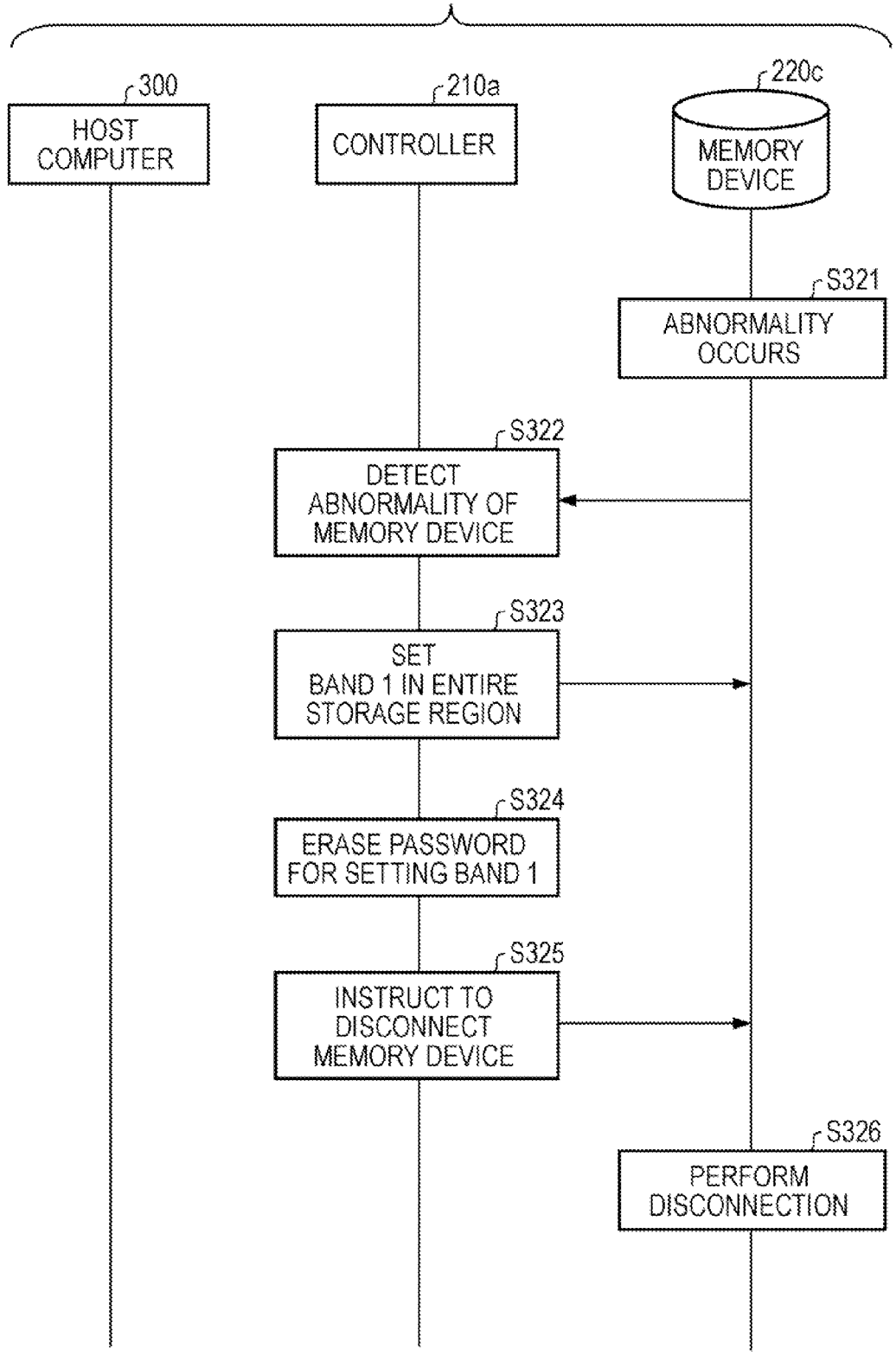

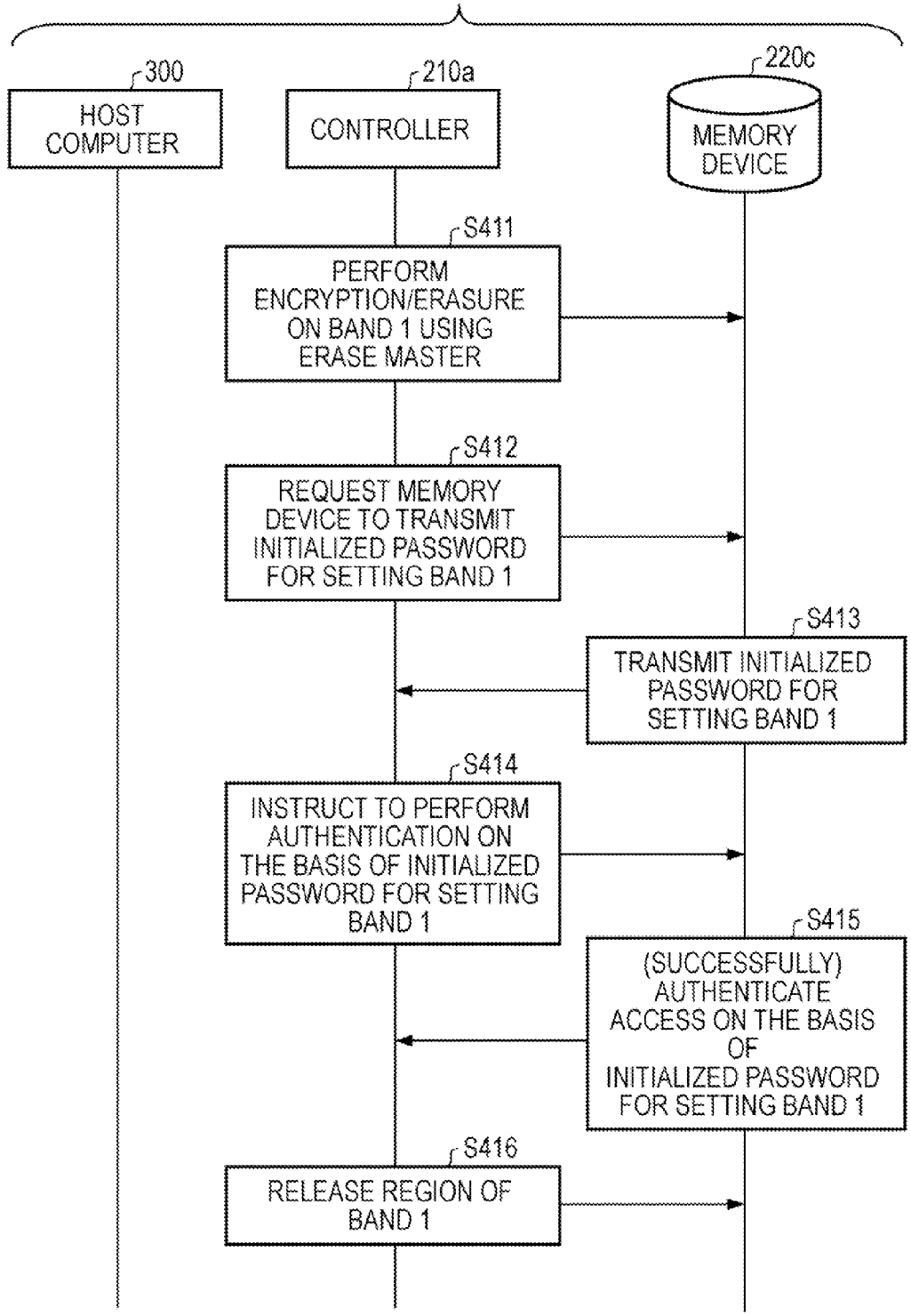

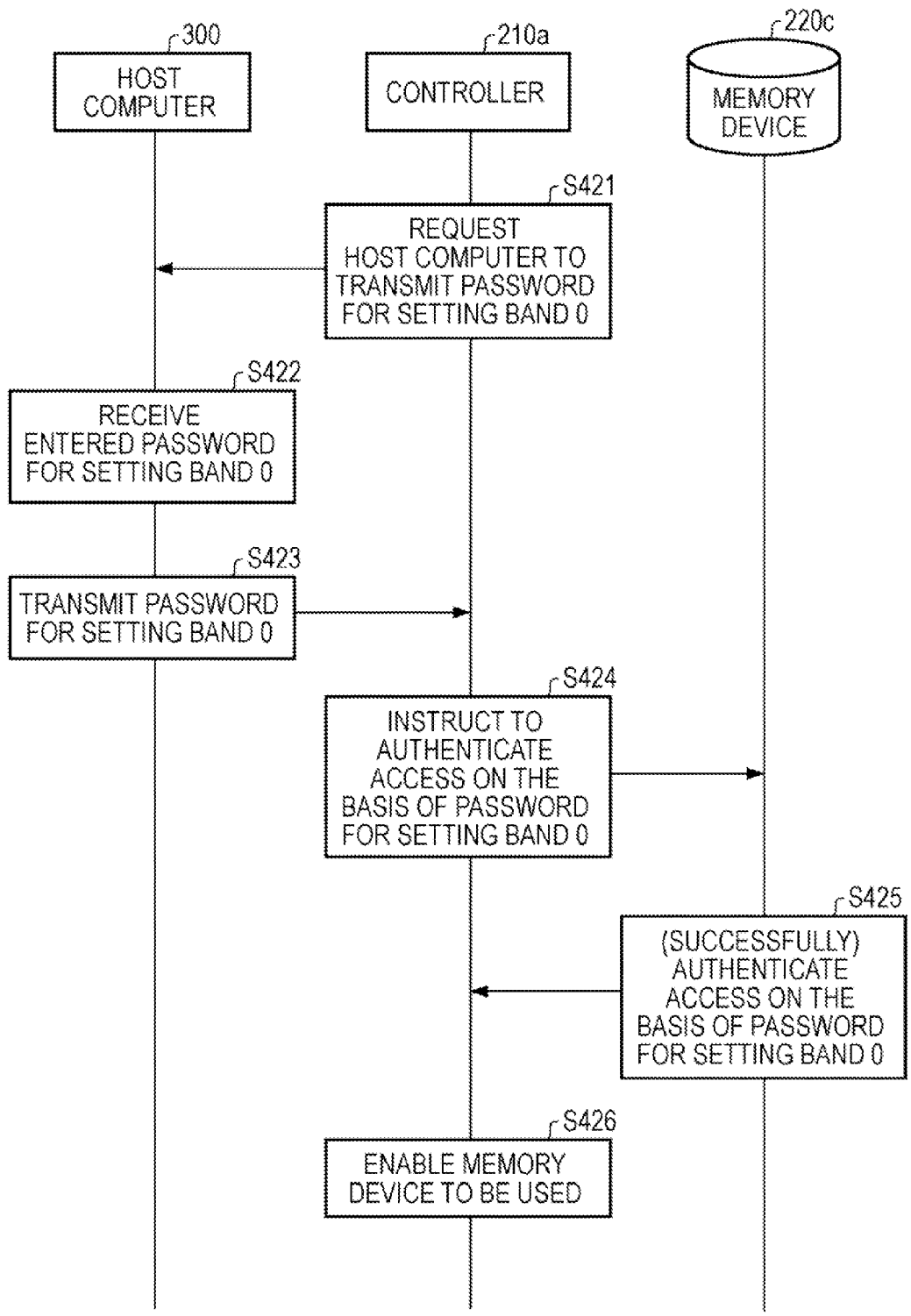

STORAGE DEVICE, MEMORY DEVICE, CONTROL DEVICE, AND METHOD FOR CONTROLLING MEMORY DEVICE

CROSS-REFERENCE TO RELATED APPLICATION

This application is based upon and claims the benefit of priority of the prior Japanese Patent Application No. 2010-252623, filed on Nov. 11, 2010, the entire contents of which are incorporated herein by reference.

FIELD

The embodiments relate to a storage device, a memory device, a control device, and a method for controlling a memory device.

BACKGROUND

Traditionally, a memory device that has a high security function such as a self-encryption drive (SED) has been used for the purpose of preventing data from leaking.

For example, a self-encrypting hard disk drive (HDD) encrypts data to be written in a storage medium and thereby prevents the data from leaking and being stolen. In addition, the self-encrypting hard disk drive restricts access to the data by performing password authentication, denies access to the data from third parties other than a specific party, prevents unauthorized access, and prevents the data from leaking and being stolen. As a technique for a high security function using multiple passwords, the following technique is known.

When access is restricted using passwords in the same manner as the SED, and one password to be used for authentication is acquired by a third party, there is a problem that it is not possible to prevent data from leaking and being stolen.

In addition, when multiple passwords are used to improve a security function, management and building of a system become complicated, and the cost and the amount of manual labor are increased by preparing a new authentication system, an encryption system and the like.

Japanese Laid-open Patent Publication No. 6-102956 is an example of the related art.

SUMMARY

According to an embodiment, a storage device includes a storage unit and a controller that controls the storage unit in accordance with a request provided from an upstream-side device. The storage unit includes a storage medium that stores data, an authentication processing unit that performs an authentication process, and a storage region managing unit that sets either a first region or a second region in a storage region. The first region may be accessed and used to perform data reading and data writing between the upstream-side device and the storage unit if the access authentication is successfully performed on the basis of a first password. The second region may be released if the access authentication is successfully performed on the basis of a second password. When the storage unit needs to be disconnected, the controller sets the second region in the storage region in which the first region has been previously set.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 17 is a sequence diagram illustrating procedures of a process that is performed to disconnect the memory device from the RAID device according to the third embodiment is disconnected.

FIG. 18 is a sequence diagram illustrating procedures of a process that is performed to connect the memory device to the RAID device according to the third embodiment.

FIG. 19 is a sequence diagram illustrating procedures of a process that is performed to connect the memory device to the RAID device according to the third embodiment.

DESCRIPTION OF EMBODIMENTS

Embodiments are described below with reference to the accompanying drawings.

First Embodiment

Figure 1:
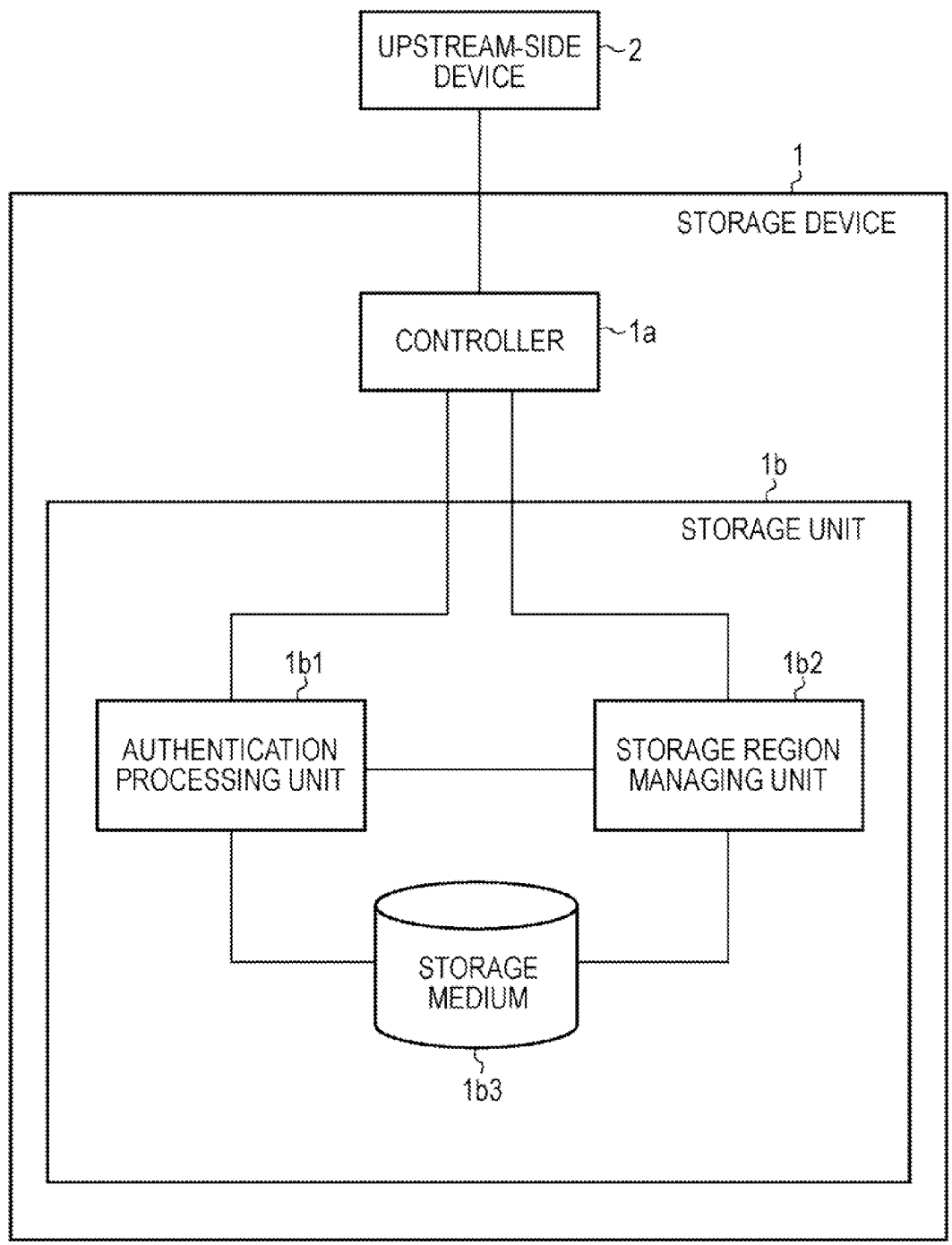
FIG. 1 is a diagram illustrating a storage device according to a first embodiment.

FIG. 1 is a diagram illustrating a storage device according to a first embodiment.

The storage device 1 according to the first embodiment reads data in accordance with a request provided from an upstream-side device 2 and writes data in accordance with a request provided from the upstream-side device 2. The upstream-side device 2 is connected to the storage device 1 through a communication line. The storage device 1 includes a controller 1a and a storage unit 1b. The storage unit 1b includes an authentication processing unit 1b1, a storage region managing unit 1b2 and a storage medium 1b3. The storage device 1 has a redundant array of independent disks (RAID) that is constituted by a plurality of storage media such as storage media 1b3.

When the storage unit 1b needs to be disconnected, the controller 1a causes the storage region managing unit 1b2 to temporarily release, from a storage region in which a first region is set, the first region and set a second region in the storage region.

Thus, when the storage unit 1b is disconnected from the storage device 1, it is needed to release the second region and enable the first region to be accessed in order to access the storage medium 1b3. Therefore, the storage unit 1b is protected by two-factor authentication using a first password and a second password.

To disconnect the storage unit 1b means to disconnect the storage unit 1b from the controller 1a and enable the storage unit 1b to be connected to at least one of another controller and a device capable of reading data from a storage unit 1b of an information processing device or the like. To disconnect the storage unit 1b may mean to physically disconnect the storage unit 1b. In addition, to disconnect the storage unit 1b may mean to logically disconnect the storage unit 1b.

The authentication processing unit 1b1 performs a process of authenticating access to the storage medium 1b3 from the upstream-side device 2.

The storage region managing unit 1b2 may set either the first region or the second region in the storage region that is included in the storage medium 1b3. If the authentication processing unit 1b1 successfully performs access authentication on the basis of the first password, the first region may be accessed and used to read and write data between the upstream-side device 2 and the storage unit 1b. If the authentication processing unit 1b1 successfully performs access authentication on the basis of the second password, the second region may be released. The storage region managing unit 1b2 may set the first region in a part of the storage region included in the storage medium 1b3 and set the second region in another part of the storage region included in the storage medium 1b3. The storage region managing unit 1b2 may exclusively set either the first region or the second region in a single part of the storage region included in the storage medium 1b3.

The storage medium 1b3 stores data that is transmitted by and received from the storage device 1 and the upstream-side device 2. As the storage medium 1b3, a magnetic storage device (such as an HDD), an optical disc, a nonvolatile semiconductor memory (such as a solid state drive (SSD)), and another storage medium capable of storing data may be used. An example of the magnetic storage device is a hard disk device (HDD). Examples of the optical disc are a DVD-RAM and a CD-RW.

When the storage unit 1b needs to be disconnected, the controller 1a of the storage device 1 causes the storage region managing unit 1b2 to temporarily release the first region from the storage region (in which the first region has been previously set) and set the second region in the storage region. Thus, even when the storage medium 1b3 is disconnected from the storage device 1, the storage device 1 may prevent data from leaking and being stolen.

Second Embodiment

A second embodiment is described below. In the second embodiment, a RAID device 100 has a function of setting a virtual storage region in the entire storage region when the storage unit 1b needs to be disconnected, setting an access restriction that requests to authenticate access to the set virtual storage region on the basis of passwords, and thereby preventing data stored in the storage region from leaking and being stolen.

Figure 2:
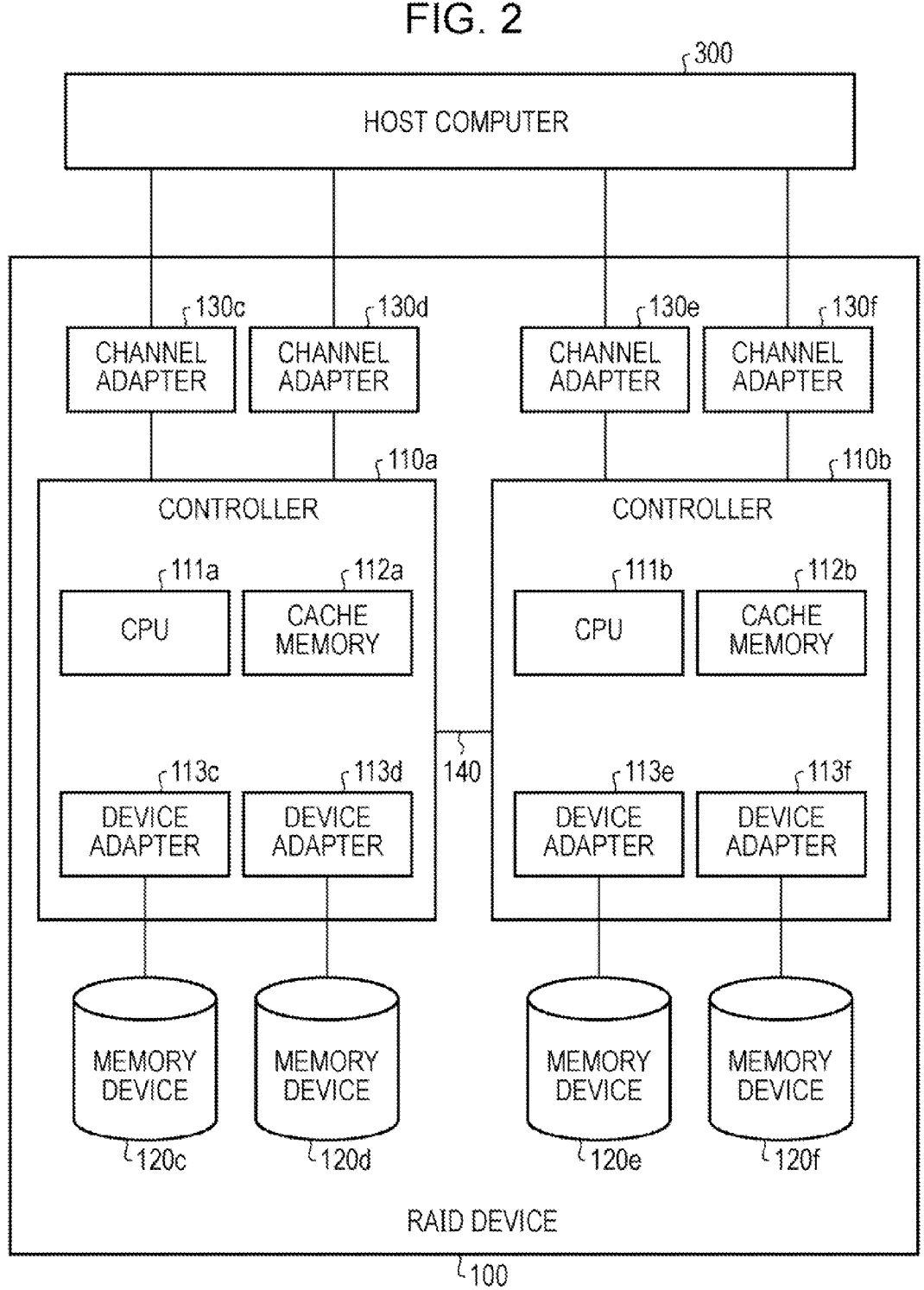
FIG. 2 is a diagram illustrating a hardware configuration of a RAID device according to a second embodiment.

FIG. 2 is a diagram illustrating a hardware configuration of the RAID device according to the second embodiment. The RAID device 100 includes controllers 110a, 110b, channel adapters 130c, 130d, 130e, 130f and memory devices 120c, 120d, 120e, 120f. The controllers 110a and 110b control the entire RAID device 100. The channel adapters 130c to 130f control connections between a host computer 300 and the controllers 110a, 110b.

The RAID device 100 causes data to be input to and output from the plurality of memory devices (described later) such as hard disk drives. The RAID device 100 has a RAID function for a redundant array of independent disks (RAID) 0 to 6, for example. The RAID is constituted by a plurality of memory devices. The RAID device 100 manages each of the disks of the RAID as a memory device.

The host computer 300 is a computer that performs a business process. The host computer 300 is connected to the RAID device 100 through a storage area network (SAN) formed according to Fiber Channel so that the host computer 300 may communicate with the RAID device 100.

The host computer 300 causes data (to be used for the business process) to be stored in the RAID device 100 and reads the data from the RAID device 100.

The controller 110a includes a central processing unit (CPU) 111a, a cache memory 112a and device adapters 113c and 113d.

The CPU 111a performs a process according to an operating system (OS) or the like and performs various types of control. In addition, the controller 110a manages resources such as the cache memory 112a, the memory devices 120c, 120d, 120e, 120f and the channel adapters 130c and 130d.

The cache memory 112a stores control data that is needed for the CPU 111a to control the RAID device 100. The control data is descriptor information and the like. The descriptor information is used during a process of backing up data to be written. In addition, the cache memory 112a temporarily stores data that has been transmitted from the host computer 300 and is to be stored in the storage devices 120c to 120f. Furthermore, the cache memory 112a temporarily stores data that has been read from the storage devices 120c to 120f in accordance with a read request transmitted from the host computer 300 and is to be transmitted to the host computer 300.

The device adapters 113c and 113d connect between the controller 110a and the storage devices 120c, 120d.

In addition, the controllers 110a and 110b are connected to each other through a bus 140. Control information and data are transmitted and received between the controllers 111a and 111b through the bus 140. The controllers 111a and 111b are attachable to and detachable from the RAID device 100.

The controller 110b includes a CPU 111b, a cache memory 112a and device adapters 113e and 113f. The controller 110b has the same configuration as the controller 110a, and a description thereof is omitted.

The storage devices 120c to 120f each have a hard disk drive that may form a RAID. The storage devices 120c to 120f store user data pieces transmitted from the host computer 300. The user data pieces do not need to be stored in a single hard disk and may be stored in a plurality of hard disks. In addition, a plurality of user data pieces may be stored in a single hard disk.

The storage devices 120c to 120f may each have a storage medium such as a nonvolatile semiconductor memory (such as an SSD), a magnetic storage device (other than a hard disk drive), an optical disc, or another storage medium capable of storing data. Examples of the magnetic storage device are a hard disk device and a magnetic tape. Examples of the optical disc are a DVD-RAM and a CD-RW. The storage devices 120c to 120f are attachable to and detachable from the RAID device 100.

The channel adapters 130c to 130f control connections between the host computer 300 and the controllers 110a, 110b.

For example, the channel adapter 130c receives a request from the host computer 300 and controls the connection between the host computer 300 and the controller 110a. Each of the controllers 110a and 110b may be connected to two or more (two in FIG. 2) of the channel adapters 130c to 130f.

For example, the controller 110a is connected to the two different channel adapters 130c and 130d so that a redundant configuration is achieved.

The channel adapters 130c to 130f are connected to the host computer 300 through the SAN formed according to Fiber Channel so that the channel adapters 130c to 130f may communicate with the host computer 300. However, the channel adapters 130c to 130f may be connected to the host computer 300 by a connection method other than Fiber Channel.

In addition, the channel adapters 130c to 130f may be connected to and communicate with the host computer 300 through dedicated lines or a virtual private network (VPN) so that the RAID device 100 is installed and located far from the computer 300.

In FIG. 2, the two controllers 110a and 110b are illustrated; and two of the device adapters 113c to 113f and two of the channel adapters 130c to 130f are provided for each of the controllers 110a and 110b. However, the number of controllers may be arbitrary, while the number of device adapters provided for each of the controllers 110a and 110b and the number of channel adapters provided for each of the controllers 110a and 110b may be arbitrary.

In FIG. 2, the single computer 300 is connected to the RAID device 100. However, a plurality of host computers may be connected to the RAID device 100.

In addition, an extension device (not illustrated) that belongs to and is controlled by the controllers 110a and 110b and includes a controller and a storage device may be connected to the RAID device 100.

With the aforementioned hardware configuration, processing functions according to the present embodiment may be achieved.

Figure 3:
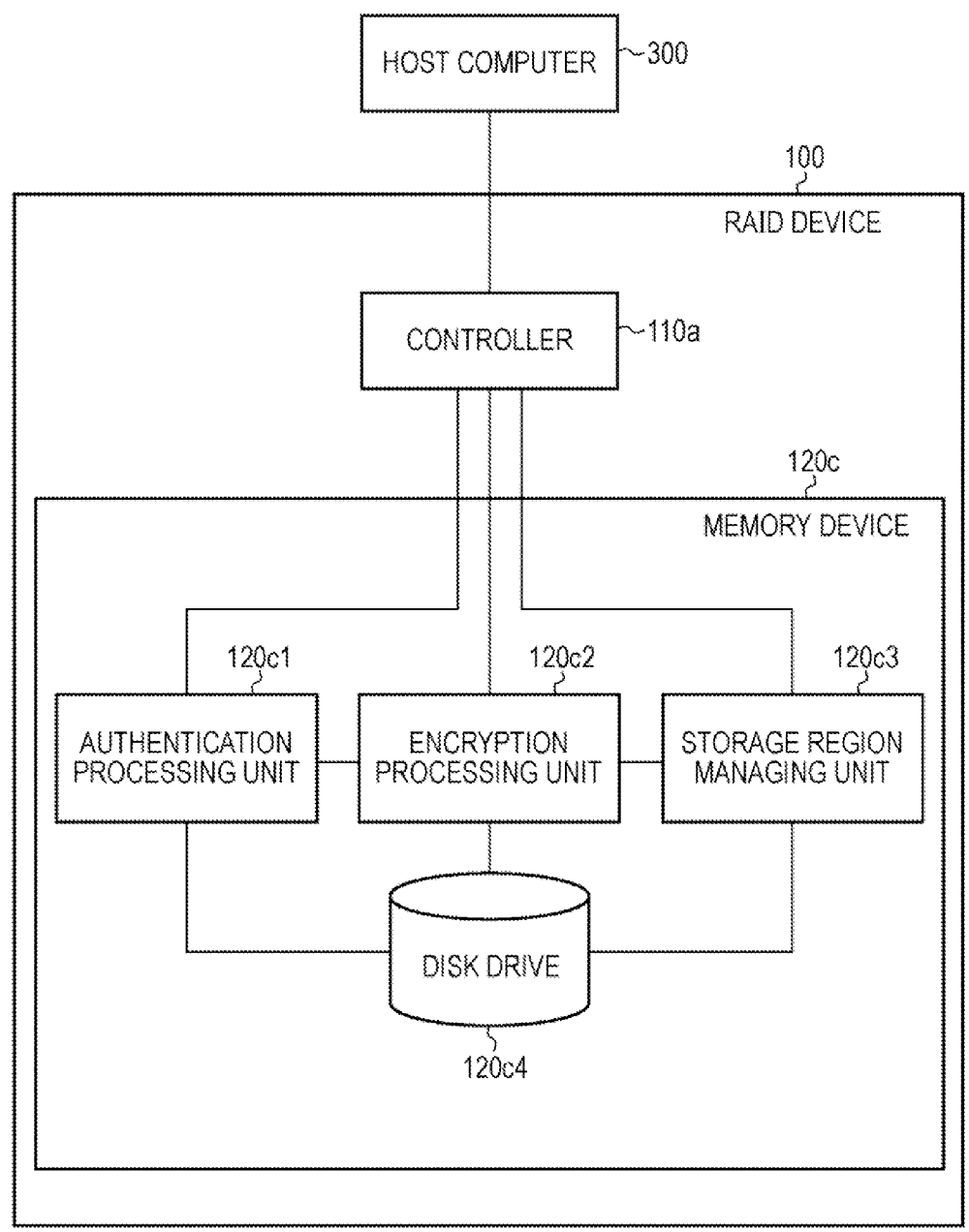
FIG. 3 is a block diagram illustrating functions of the RAID device according to the second embodiment.

FIG. 3 is a block diagram illustrating the functions of the RAID device 100 according to the second embodiment.

The RAID device 100 according to the present embodiment is connected to the host computer 300 through the communication lines. The RAID device 100 stores data transmitted from the host computer 300 in the RAID constituted by the storage devices 120c and the like. In addition, the RAID device 100 reads the data (stored in the RAID) in accordance with a request provided from the host computer 300 and transmits the read data to the host computer 300.

The RAID device 100 includes the controller 110a and the memory device 120c. The memory device 120c includes an authentication processing unit 120c1, an encryption processing unit 120c2, a storage region managing unit 120c3 and a disk drive 120c4. The memory device 120c and the other storage devices 120d to 120f form the RAID.

In addition, the disk drive 120c4 has a storage region in which bands (described later with reference to FIG. 4) may be set.

The RAID device 100 uses a band set in the storage region of the disk drive 120c4, reads data in accordance with a request provided from the host computer 300, and writes data in accordance with a request provided from the host computer 300.

The memory device 120c is described below. The storage devices 120d to 120f each have the same configuration as the memory device 120c and a description thereof is omitted.

When the memory device 120c needs to be disconnected, the controller 110a releases a band 0 from the storage region of the disk drive 120c4 and sets a band 1 in the storage region (of the disk drive 120c4) in which the band 0 has been previously set.

Thus, when the memory device 120c is disconnected from the RAID device 100, it is needed to release the band 1 and enable the band 0 to be accessed in order to access the disk drive 120c4. Therefore, the memory device 120c is protected by two-factor authentication using a password for setting the band 0 and a password for setting the band 1. The band 0 is an example of a first band. The band 1 is an example of a second band.

To disconnect the memory device 120c means to disconnect the memory device 120c from the controller 110a and enable the memory device 120c to connected to a device (such as another controller or an information processing device) capable of reading data stored in the memory device 120c. To disconnect the memory device 120c may mean to physically disconnect the memory device 120c. In addition, to disconnect the memory device 120c may mean to logically disconnect the memory device 120c.

If the disconnected memory device 120c needs to be reconnected to the RAID device 100 and the authentication processing unit 120c1 successfully authenticates access on the basis of the password for setting the band 1, the controller 110a causes the storage region managing unit 120c3 to release the band 1 set in the storage region of the disk drive 120c4 and set the band 0 in the storage region of the disk drive 120c4.

In addition, if the authentication processing unit 120c1 successfully authenticate access on the basis of the password for setting the band 1, the controller 110a cause the storage region managing unit 120c3 to enable the band 0 set in the storage region of the disk drive 120c4 to be accessed.

The password for setting the band 0 is an example of the first password. The password for setting the band 1 is an example of the second password.

When the disconnected memory device 120c needs to be reconnected to the RAID device 100, the authentication processing unit 120c1 authenticates access on the basis of the password for setting the band 0 and authenticates access on the basis of the password for setting the band 1 so as to permit or deny the access.

Thus, the RAID device 100 prevents unauthorized access to the disc drive 120c4.

The encryption processing unit 120c2 encrypts data that has been transmitted from the host computer 300 and is to be written in the disc drive 120c4. In addition, the encryption processing unit 120c2 decrypts the encrypted data in order to read the data in accordance with a request provided from the host computer 300.

The storage region managing unit 120c3 sets either the band 0 or the band 1 in the storage region of the disk drive 120c4.

If the authentication processing unit 120c1 successfully performs access authentication on the basis of the password for setting the band 0, the band 0 may be accessed and data is encrypted by the encryption processing unit 120c2 using an encryption key for the band 0 so that the band 0 is used to read and write the data between the memory device 120c and the host computer 300. If the authentication processing unit 120c1 successfully performs access authentication on the basis of the password for setting the band 1, the band 1 may be released and data is encrypted by the encryption processing unit 120c2 using an encryption key for the band 1.

The storage region managing unit 120c3 may set the band 0 in a part of the storage region of the disk drive 120c4 and set the band 1 in another part of the storage region of the disk drive 120c4. The storage region managing unit 120c3 may exclusively set either the band 0 or the band 1 in a single part of the storage region of the disk drive 120c4.

The encryption key for the band 0 is an example of a first encryption key. The encryption key for the band 1 is an example of a second encryption key.

The disk drive 120c4 stores data that is transmitted and received between the host computer 300 and the memory device 120c. The disk drive 120c4 is an HDD. However, the disk drive 120c4 is not limited to the HDD. As the storage medium of the memory device 120c, a magnetic storage device (other than an HDD), an optical disc, a nonvolatile semiconductor memory (such as an SSD), and another storage medium capable of storing data may be used. An example of the magnetic storage device (other than an HDD) is a magnetic tape. Examples of the optical disk are a DVD-RAM and a CD-RW.

Figure 4:
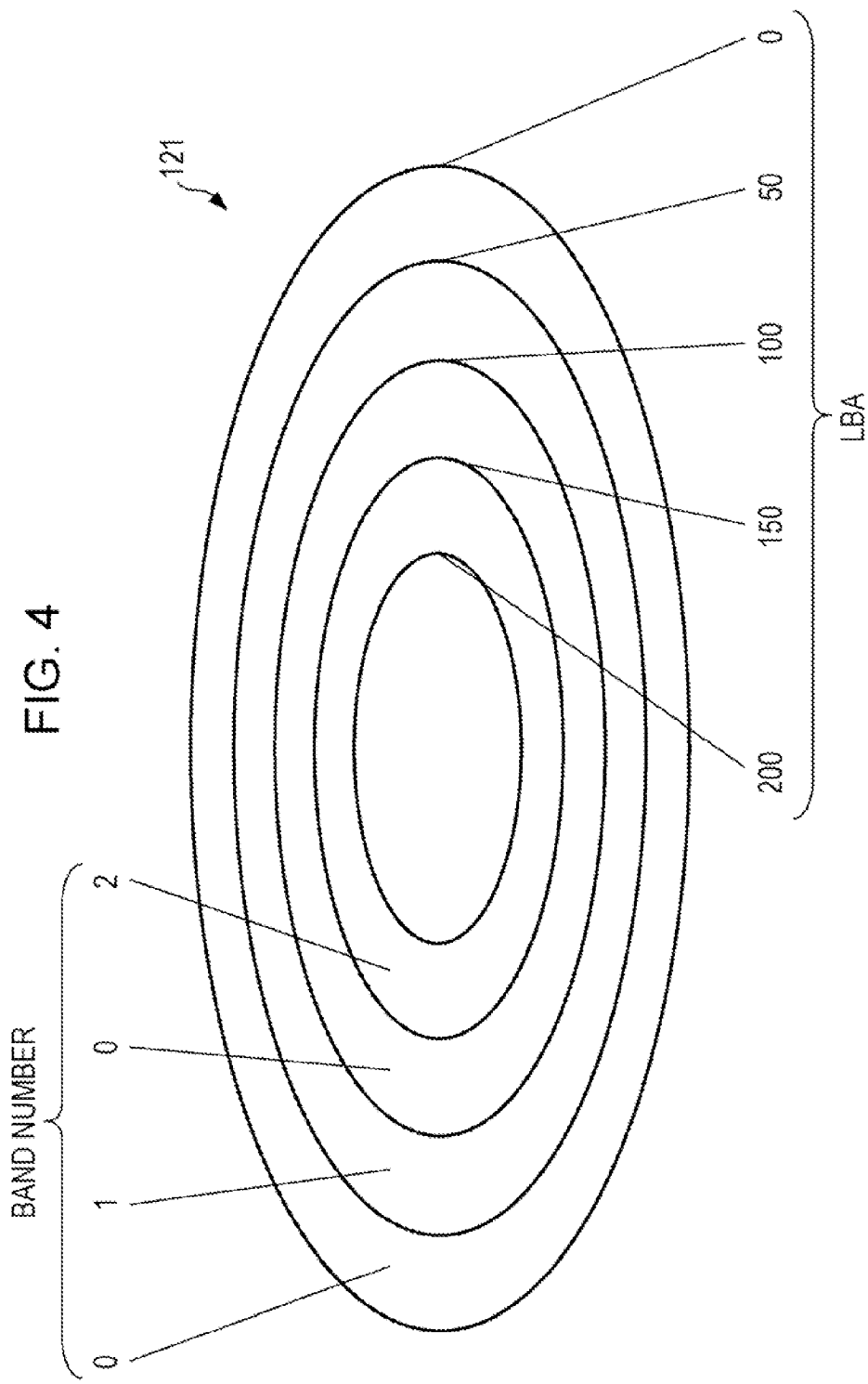
FIG. 4 is a diagram illustrating a storage region of a memory device according to the second embodiment.

FIG. 4 is a diagram illustrating the storage region of the memory device according to the second embodiment.

The memory device 120c that is included in the RAID device 100 according to the present embodiment has a storage region 121 in the disk drive 120c4.

The memory devices 120d to 120f each have a storage region that has the same configuration as the storage region 121 of the memory device 120c, and a description thereof is omitted.

The storage region 121 illustrated in FIG. 4 has three regions indicated by band numbers "0", "1" and "2". The bands that are virtual storage regions are set in the storage region 121. In other words, the bands are set in the disk drive 120c4 and are regions that store data. The bands are set on a storage surface of the disk drive 120c4 and each have a plurality of consecutive tracks.

The band number "0" indicates a global band (hereinafter referred to as a band 0). The band 0 has one or more consecutive regions. All regions of the band 0 may not be consecutive.

The global band is a region other than local bands (for example, bands 1 and 2 described later) set by a user. The sizes of the local bands are not limited. The user may set the local bands so that the local bands each have an arbitrary size as long as the storage region 121 has an available space.

The band numbers "1" and "2" indicate the independent local bands (hereinafter referred to as band 1 and band 2). The local bands indicated by the band numbers "1" and "2" are set so that a part of the global band is sectioned by the local bands. The band numbers "1" and "2" each indicate a single independent storage region, while the bands indicated by the band numbers "1" and "2" each have one or more consecutive regions as illustrated in FIG. 4.

Each of the bands may not be set so that the band overlaps a sector of another band.

A logical block address (LBA) is a value that indicates the position of data in the storage region 121 using a sector as a reference. It is assumed that the band 1 is set in sectors of LBAs 50 to 100 of the storage region 121, while the sectors of the LBAs 50 to 100 are among sectors of LBAs 0 to 200 of the storage region 121.

In addition, it is assumed that the band 2 is set in sectors of the LBA 150 to 200. In addition, it is assumed that the band 0 is set in the other sectors.

Since data is stored in the memory device 120c using the bands set in the storage region 121 of the memory device 120c in the RAID device 100 according to the present embodiment, the RAID device 100 may prevent the data from leaking and being stolen when a third party disconnects the memory device 120c from the RAID device 100, connects the memory device 120c to another RAID device, and makes unauthorized access to try to read the data stored in the memory device 120c.

In addition, the user may specify a range of LBAs in the storage region 121 for each of the bands and set the specified range for each of the bands. The user may set an arbitrary number of local bands in the storage region 121.

In addition, the user may set a password for each of the bands so that the passwords for the bands are different from each other, while the user may set an encryption key for each of the bands so that the encryption keys for the bands are different from each other.

In addition, the user may change the passwords set for the bands and change the encryption keys set for the bands.

In addition, the encryption keys are stored in a predetermined region of the disk drive 120c4 of the memory device 120c and may not be read from the outside of the memory device 120c.

In addition, a single data piece needs to be stored in a single band and is not written in and read from a plurality of bands.

In addition, when the user needs to release the setting of any of the local bands, the range of the LBAs of the local band to be released is set to 0.

Thus, a storage region in which the released local band has been previously set is set to the global band (band 0). In addition, when data is written in an arbitrary sector of the global band, a local band (for example, the band 1) is set in a storage region including the interested sector after the writing of the data, and the setting of the band 1 is released without writing of data in the interested sector so that the region in which the band 1 has been previously set is set to the band 0, the data written in the interested sector may be read.

When a power supply of the RAID device 100 is turned off, or when a power supply of the memory device 120c is turned off owing to a disconnection of the memory device 120c from the RAID device 100 or the like, the storage region managing unit 120c3 denies (locks) access to each of the bands of the storage region 121. After that, when the power supply of the memory device 120c is turned on, the authentication processing unit 120c1 requests the host computer 300 to transmit the passwords for setting the bands set in the storage region 121. Then, the authentication processing unit 120c1 performs password authentication on the basis of the passwords (for setting the bands) transmitted from the host computer 300.

If the password authentication is successfully performed by the authentication processing unit 120c1 for each of the bands set in the storage region 121, the storage region managing unit 120c3 releases the locking of the band of the storage region 121 so that data that is stored in the band may be accessed by the host computer 300.

On the other hand, if the password authentication is not successfully performed by the authentication processing unit 120c1, the storage region managing unit 120c3 maintains the locking of the interested band of the storage region 121.

Thus, if the memory device 120c is disconnected from the RAID device 100 and connected to another RAID device, the other RAID device is activated, and authentication is not successfully performed on the basis of passwords transmitted from the host computer 300, or if the memory device 120c is disconnected from the RAID device 100, connected to another information processing device or the like, and independently activated, and authentication is not successfully performed on the basis of passwords transmitted from the host computer 300, the user may not access the storage region 121.

In this manner, the data that is stored in the memory device 120c is protected from unauthorized access.

In addition, when the power supply of the RAID device 100 is turned on, the locking of the bands of the storage region 121 is released for each of the bands. Even when any of the passwords for setting the bands is changed, the encryption keys are not changed.

When each of the encryption keys is changed, data that is encrypted using the encryption key before the change in the encryption key may not be decrypted using the encryption key after the change in the encryption key.

Thus, the encryption keys are changed instead of erasing data and the data stored in the memory device is disabled to be decrypted (or encryption/erasure is performed).

In the encryption/erasure, the authentication processing unit 120c1 performs authentication on the basis of an "erase master" that is a password for erasure and different from the passwords for setting the bands. In the encryption/erasure, if the authentication processing unit 120c1 successfully performs the authentication on the basis of the "erase master", the encryption processing unit 120c2 changes the encryption keys.

After the memory device 120c performs the encryption/erasure, the locking is released and the storage region 121 may be accessed. In this case, new encryption keys are set.

When the encryption keys are changed, all the passwords for setting the bands are initialized (or set to passwords initially set by a vendor). The passwords initially set by the vendor are stored in the authentication processing unit 120c1, for example.

In addition, since the authentication processing unit 120c1 authenticates access to data stored in the storage region 121, the memory device 120c may protect the data from unauthorized access. Data to be stored in the storage region 121 is encrypted by the encryption processing unit 120c2 of the memory device 120c. Thus, even if unauthorized access is made or the data stored in the storage region 121 is directly read, the memory device 120c may prevent the data stored in the storage region 121 from leaking and being stolen. In addition, since the memory device 120c sets the passwords for the bands set in the storage region 121, each of users may access only a band permitted to be accessed.

When new bands are set, the encryption processing unit 120c2 of the memory device 120c automatically and randomly generates encryption keys for the bands so that the encryption keys for the bands of the storage region 121 are different from each other. The encryption processing unit 120c2 sets the generated encryption keys for the bands.

The encryption keys may not be referenced from the outside of the memory device 120c and may not be set from the outside of the memory device 120c. The controller 110a may instruct the memory device 120c to change the encryption keys for the bands on an encryption key basis (or to perform the encryption/erasure).

When the memory device 120c receives, from the controller 110a, the instruction to change the encryption keys, the encryption processing unit 120c2 erases the original encryption keys and set new encryption keys.

In this manner, the controller 110a may cause the memory device 120c to perform the encryption/erasure.

Figure 5:
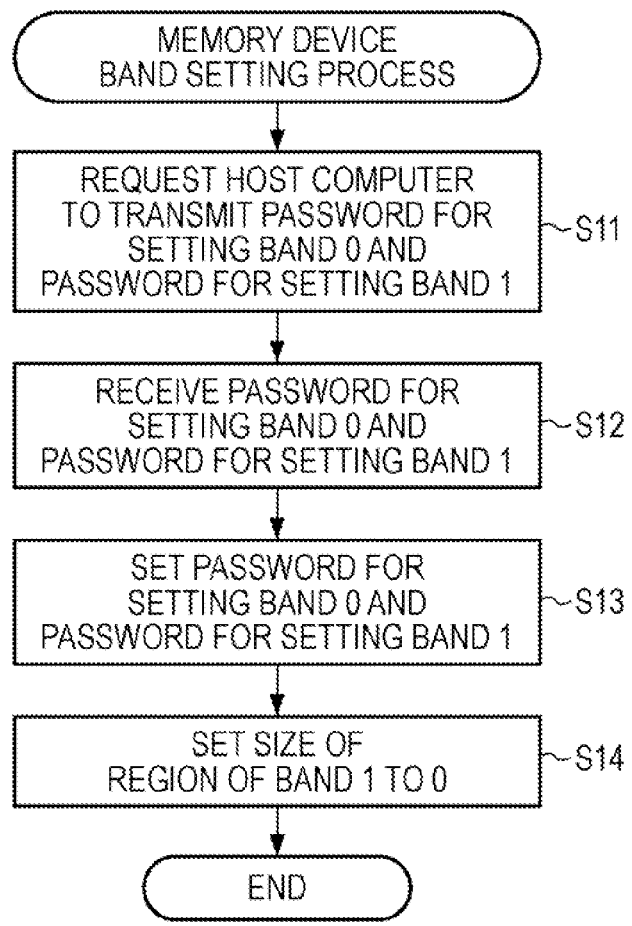
FIG. 5 is a flowchart of procedures of a memory device band setting process according to the second embodiment.

FIG. 5 is a flowchart of procedures of a memory device band setting process according to the second embodiment.

The RAID device 100 according to the present embodiment performs the memory device band setting process by setting the passwords for setting the bands 0 and 1 and setting the band 0 in the storage region 121 when the memory device 120c needs to be connected or needs to start to be used before writing of data in the storage region 121 of the memory device 120c.

The memory device band setting process illustrated in FIG. 5 is described below with reference to operation numbers of the flowchart illustrated in FIG. 5.

In S11, the controller 110a requests the host computer 300 to transmit the password for setting the band 0 and the password for setting the band 1. The user enters the password for setting the band 0 and the password for setting the band 1 in the host computer 300. Then, the host computer 300 transmits the entered password for setting the band 0 and the entered password for setting the band 1 to the RAID device 100.

In S12, the controller 110a receives the password for setting the band 0 and the password for setting the band 1 from the host computer 300.

In S13, the controller 110a sets the received password for setting the band 0 and the received password for setting the band 1 as the passwords for setting the bands.

In S14, the controller 110a sets the size of the region of the band 1 to 0. Thus, the band 0 is set in all regions of the storage region 121 in the memory device 120c. All data to be written in the memory device 120c is stored in the band 0.

Figure 6:
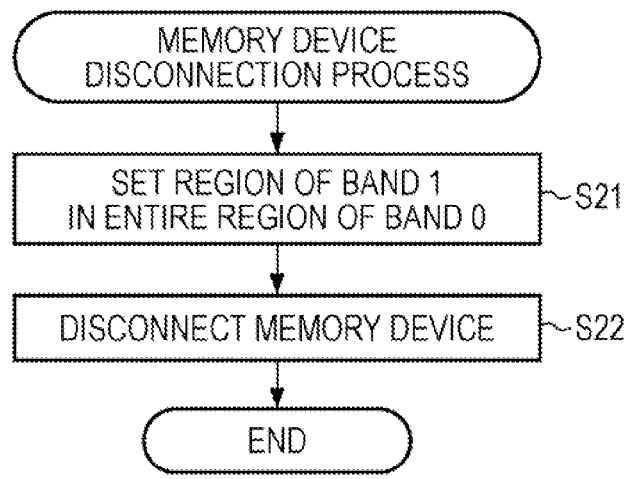
FIG. 6 is a flowchart of procedures of a memory device disconnection process according to the second embodiment.

FIG. 6 is a flowchart of procedures of a memory device disconnection process according to the second embodiment. If the RAID device 100 according to the present embodiment detects an abnormality of the memory device 120c, the RAID device 100 performs the memory device disconnection process.

The memory device disconnection process illustrated in FIG. 6 is described below with reference to operation numbers of the flowchart illustrated in FIG. 6.

In S21, the controller 110a sets the region of the band 1 in the entire region of the band 0.

Thus, the band 1 is set in all the regions of the storage region 121.

In S22, the controller 110a performs the process of disconnecting the memory device 120c and causes the memory device 120c to be disconnected from the controller 110a. The storage region managing unit 120c3 of the memory device 120c disconnects the memory device 120c from the controller 110a on the basis of the control of the controller 110a.

In this manner, the memory device 120c is disconnected from the RAID device 100.

Figure 7:
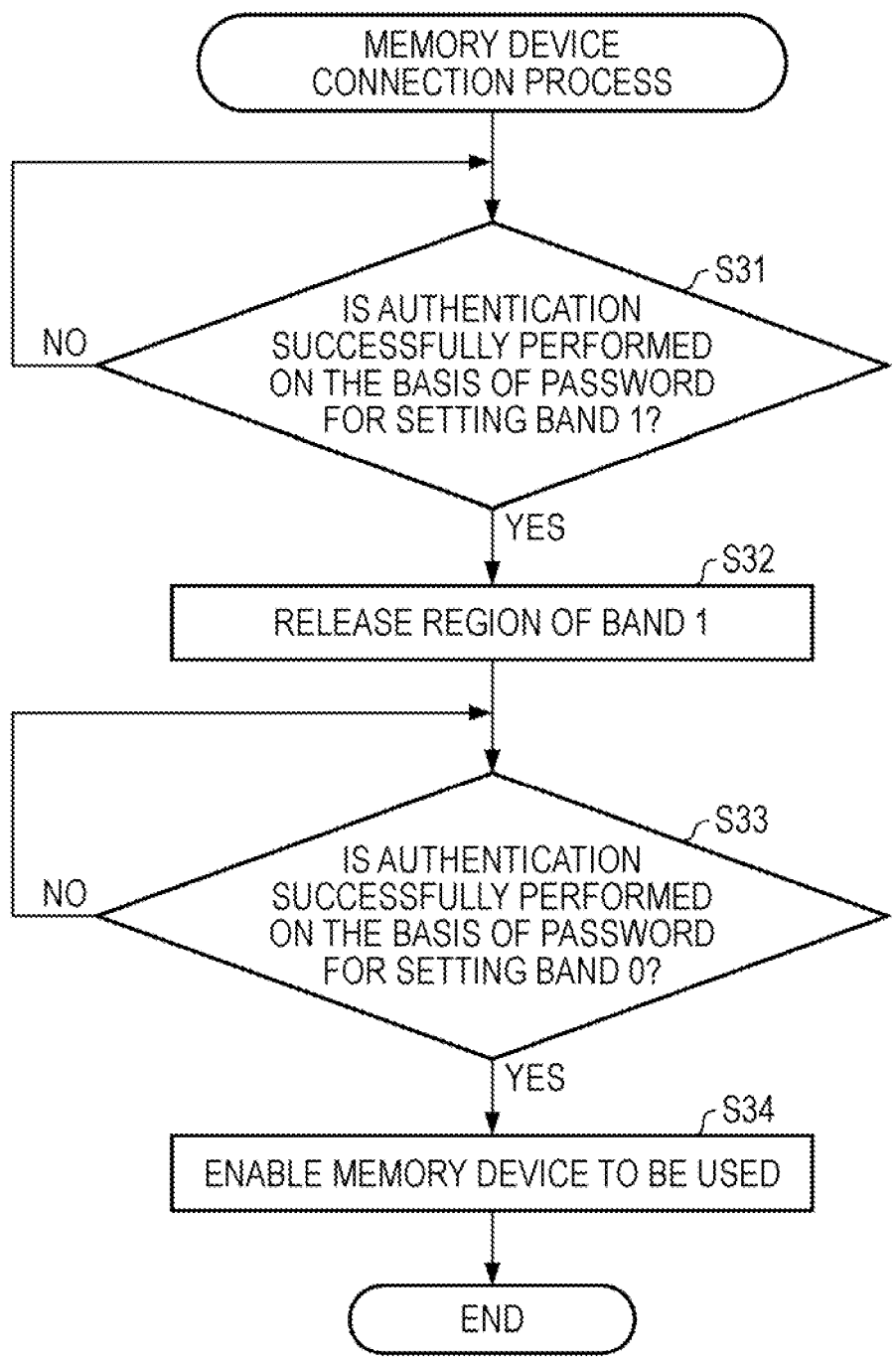
FIG. 7 is a flowchart of procedures of a memory device connection process according to the second embodiment.

FIG. 7 is a flowchart of procedures of a memory device connection process according to the second embodiment. When the user attaches the disconnected memory device 120c to the RAID device 100, the RAID device 100 according to the present embodiment authenticates the user on the basis of the password for setting the band 1, releases the region of the band 1, and sets the band 0 in order to reconnect the memory device 120c to the RAID device 100. In addition, the RAID device 100 authenticates the user on the basis of the password for setting the band 0 and performs the memory device connection process so that the storage region 121 of the memory device 120c may be used. The memory device connection process illustrated in FIG. 7 is described below with reference to operation numbers of the flowchart illustrated in FIG. 7.

In S31, the controller 110a requests the host computer 300 to transmit the password for setting the band 1 and causes the authentication processing unit 120c1 to authenticate the user on the basis of the password for setting the band 1. If the authentication processing unit 120c1 successfully authenticates the user on the basis of the password for setting the band 1 (Yes in S31), the process proceeds to operation S32. On the other hand, if the authentication processing unit 120c1 does not successfully authenticate the user on the basis of the password for setting the band 1 (No in S31), the authentication process of operation S31 is repeated.

In S32, the controller 110a causes the storage region managing unit 120c3 to release the region of the band 1. Thus, the band 0 is set in the region in which the band 1 has been previously set.

In S33, the controller 110a requests the host computer 300 to transmit the password for setting the band 0 and causes the authentication processing unit 120c1 to authenticate the user on the basis of the password transmitted from the host computer 300. If the authentication processing unit 120c1 successfully authenticates the user on the basis of the password for setting the band 0 (Yes in S33), the process proceeds to operation S34. On the other hand, if the authentication processing unit 120c1 does not successfully authenticate the user on the basis of the password for setting the band 0 (No in S33), the authentication process of operation S33 is repeated.

In S34, the controller 110a causes the storage region managing unit 120c3 to enable the memory device 120c to be used for the RAID device 100.

Thus, data that is stored in the region of the band 0 may be read by the host computer 300, and data may be written in the region of the band 0 by the host computer 300.

In the memory device disconnection process according to the present embodiment, if the authentication processing unit 120c1 successfully authenticates the user on the basis of the password for setting the band 1 in S31, the region of the band 1 is released and the band 0 is set in S32. After that, if the authentication processing unit 120c1 successfully authenticates the user on the basis of the password for setting the band 0 in S33, the storage region managing unit 120c3 enables the band 0 to be accessed in S34 so that the memory device 120c may be used.

However, the RAID device 100 is not limited to this. The RAID device 100 may be configured so that after the authentication processing unit 120c1 successfully authenticates the user on the basis of the password for setting the band 1 and the storage region managing unit 120c3 enables the band 0 to be accessed, the authentication processing unit 120c1 successfully authenticates the user on the basis of the password for setting the band 1, the region of the band 0 is released and the band 0 is set so that the memory device 120c may be used.

Figure 8:
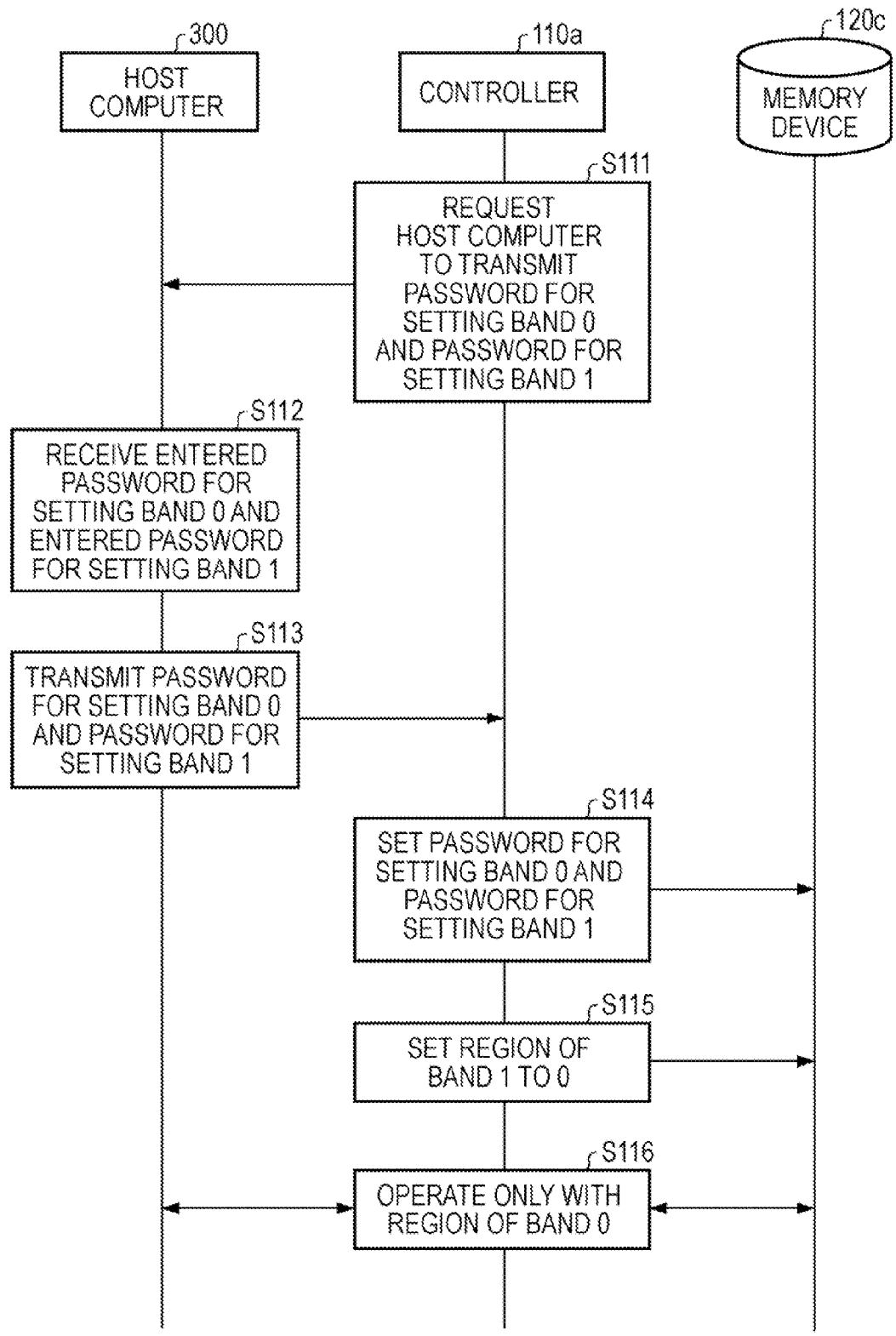
FIG. 8 is a sequence diagram illustrating procedures of a process that is performed to set a band of a memory device in the RAID device according to the second embodiment.
Figure 9:
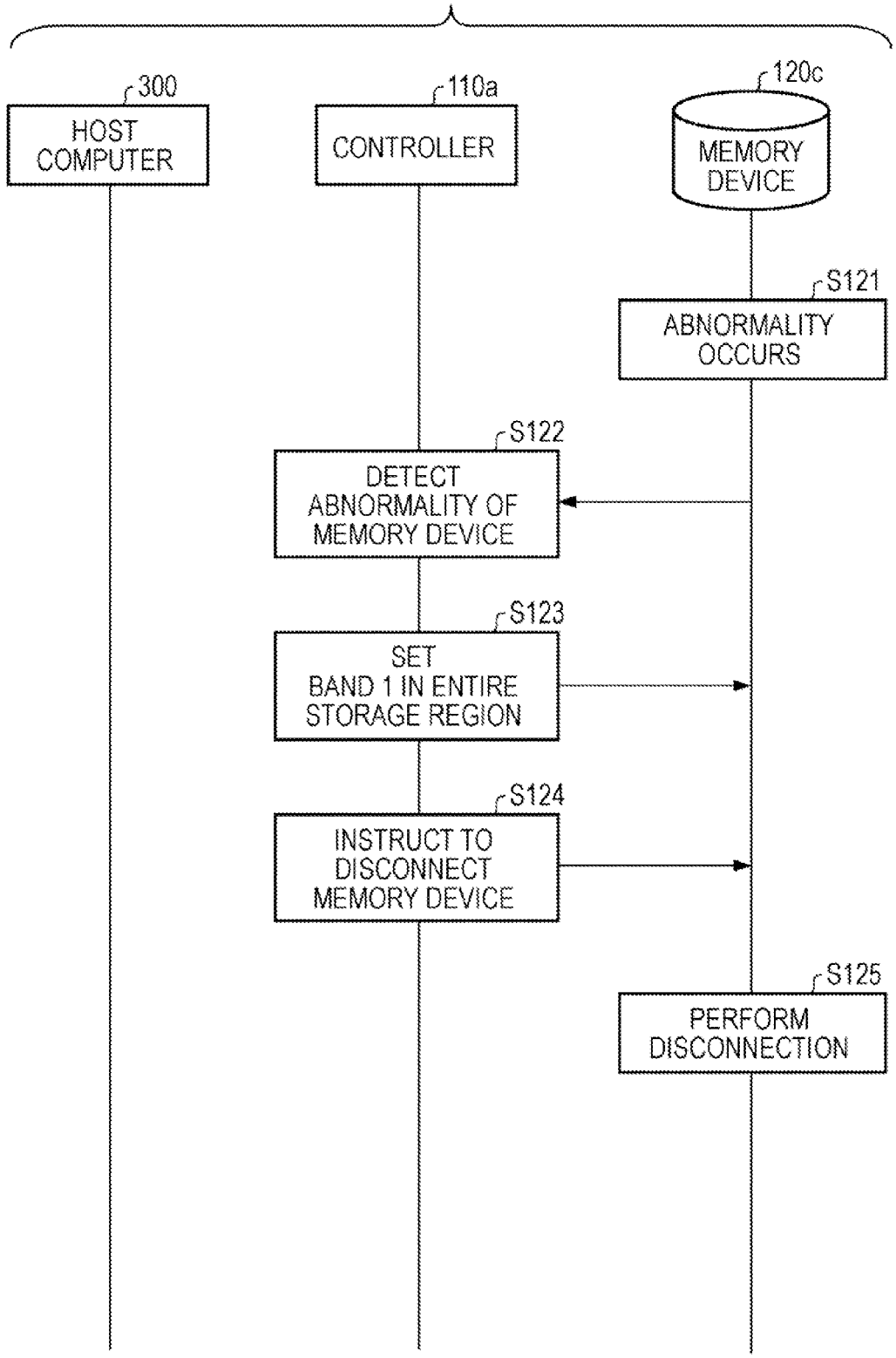
FIG. 9 is a sequence diagram illustrating procedures of a process that is performed to disconnect the memory device from the RAID device according to the second embodiment.

FIG. 8 is a sequence diagram illustrating procedures of a process that is performed to set the band of the memory device in the RAID device 100, while FIG. 9 is a sequence diagram illustrating procedures of a process that is performed to disconnect the memory device from the RAID device 100. The RAID device 100 according to the present embodiment receives the password for setting the band 0 and the password for setting the band 1 from the host computer 300.

Next, the RAID device 100 sets the received passwords. In addition, the RAID device 100 sets the band 0 in all the regions of the storage region 121 of the memory device 120c so that the set band 0 is used to read and write data. If an abnormality is detected in the memory device 120c during an operation of the RAID device 100, the band 1 is set in the band 0 that is used to read and write data. After that, the memory device 120c is disconnected.

The process that is performed to set the band of the memory device is described below with reference to FIG. 8, while the process that is performed to disconnect the memory device is described below with reference to FIG. 9.

First, the process of operations S111 to S116 in which the password for setting the band 0 and the password for setting the band 1 are set and the band 0 is set in the storage region 121 is described below.

In S111, the controller 110a requests the host computer 300 to transmit the password for setting the band 1 and the password for setting the band 0 that is to be set in the storage region 121 of the memory device 120c.

In S112, the host computer 300 displays a password setting screen on a monitor connected to the host computer 300, for example, and receives the password (entered by the user) for setting the band 0 and the password (entered by the user) for setting the band 1 in accordance with the request provided in S111.

In S113, the host computer 300 transmits the password (received in S112) for setting the band 0 and the password (received in S112) for setting the band 1 to the controller 110a of the RAID device 100.

In S114, when the controller 110a receives the password (transmitted in S113) for setting the band 0 and the password (transmitted in S113) for setting the band 1, the controller 110a sets the received password for setting the band 0 and the received password for setting the band 1 as the password for setting the band 0 of the storage region 121 and the password for setting the band 1 of the storage region 121.

In S115, the controller 110a sets the region of the band 1 of the storage region 121 to 0. In other words, the controller 110a sets all the regions of the storage region 121 to the band 0.

In S116, the controller 110a operates with the band 0 set in the storage region 121 for reading and writing user data of the host computer 300.

Specifically, when the host computer 300 transmits data (to be written) to the RAID device 100, the controller 110a writes the data in the band 0 set in the storage region 121 in S115. When the host computer 300 transmits a request to read data to the RAID device 100, the controller 110a reads the data from the band 0 set in the storage region in S115 in accordance with the request and transmits the read data to the host computer 300.

Next, the process of operations S121 to S125 is described below. In the process of operations S121 to S125, an abnormality occurs in a memory device (for example, memory device 120c) included in the RAID device 100, the controller 110a detects the abnormality of the memory device 120c, and the memory device 120c is disconnected from the RAID device 100.

In S121, an abnormality occurs in the memory device 120c.

In S122, the controller 110 detects the abnormality that occurs in the memory device 120c.

In S123, the controller 110a sets the band 1 in all the regions of the storage region 121 of the memory device 120c.

In S124, the controller 110a instructs the memory device 120c to be disconnected from the RAID device 100.

In S125, the memory device 120c is disconnected from the RAID device 100.

Figure 10:
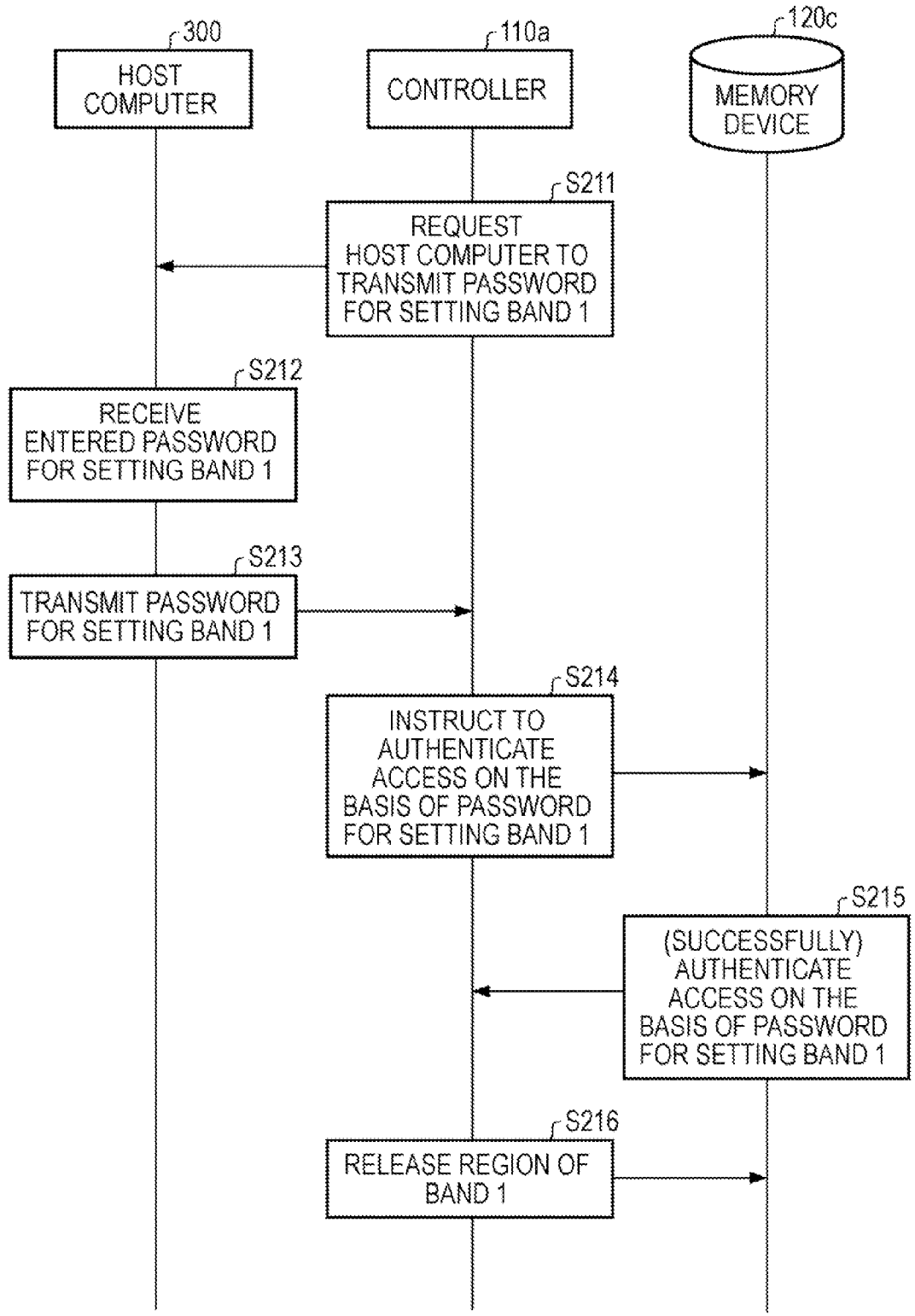
FIG. 10 is a sequence diagram illustrating procedures of a process that is performed to connect the memory device to the RAID device according to the second embodiment.
Figure 11:
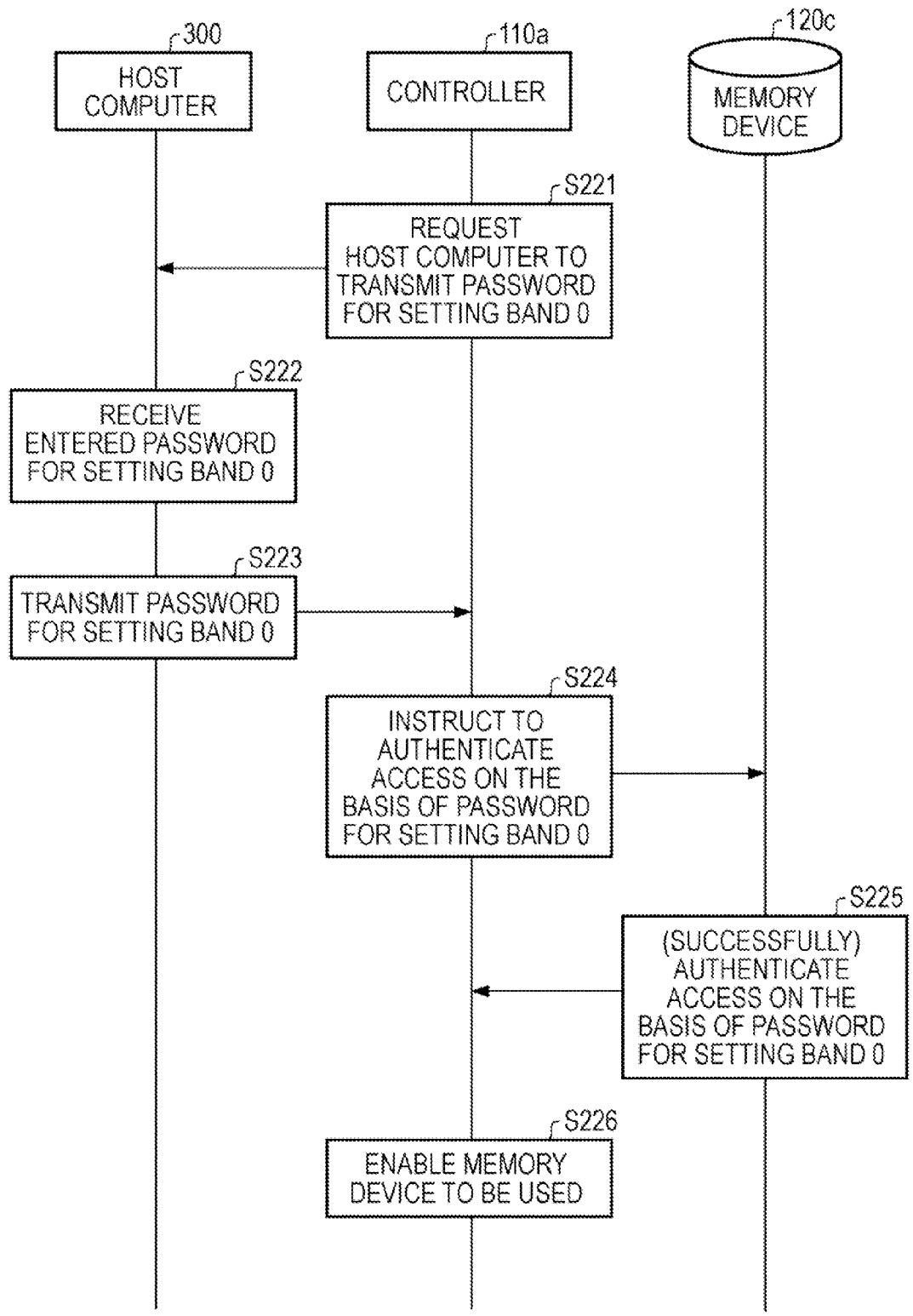
FIG. 11 is a sequence diagram illustrating procedures of a process that is performed to connect the memory device to the RAID device according to the second embodiment.

FIGS. 10 and 11 are sequence diagrams illustrating procedures of a process that is performed to connect the memory device to the RAID device according to the second embodiment.

The memory device (for example, memory device 120c) that is disconnected from the RAID device 100 owing to the occurrence of the abnormality is reconnected to the RAID device 100 according to the present embodiment. If the authentication is successfully performed on the basis of the password for setting the band 0 and the password for setting the band 1, data may be read from and written in the storage region 121.

The process that is performed to connect the memory device is described below with reference to FIGS. 10 and 11.

In S211, the controller 110a requests the host computer 300 to transmit the password for setting the band 1 in order to authenticate access to the band 1 set in the storage region 121 of the memory device 120c.

In S212, the host computer 300 receives the password (entered by the user) for setting the band 1 in accordance with the request provided in S211.

In S213, the host computer 300 transmits the password (received in S212) for setting the band 1 to the controller 110a.

In S214, when the controller 110a receives the password (transmitted in S213) for setting the band 1, the controller 110a transmits the received password for setting the band 1 to the memory device 120c and instructs the memory device 120c to authenticate access to the band 1 on the basis of the password for setting the band 1.

In S215, when the memory device 120c receives the password (transmitted in S214) for setting the band 1, the memory device 120c authenticates access to the band 1 on the basis of the password for setting the band 1 and transmits the result of the authentication to the controller 110a.

In this case, it is assumed that the memory device 120c successfully authenticates access to the band 1 on the basis of the received password for setting the band. The memory device 120c notifies, on the basis of the result of the authentication, the controller 110a that the memory device 120c successfully authenticates access to the band 1 on the basis of the received password for setting the band 1.

In S216, the controller 110a releases the region of the band 1 set in the storage region 121 of the memory device 120c. Thus, the band 0 is set in the entire region in which the band 1 has been previously set in the storage region 121.

In S221, the controller 110a requests the host computer 300 to transmit the password for setting the band 0 in order to authenticate access to the band 0 set in the storage region 121 of the memory device 120c.

In S222, the host computer 300 receives the password (entered by the user) for setting the band 0 in accordance with the request provided in S221.

In S223, the host computer 300 transmits the password (received in S222) for setting the band 0 to the controller 110a.

In S224, when the controller 110a receives the password (transmitted in S223) for setting the band 0, the controller 110a transmits the received password for setting the band 0 to the memory device 120c and instructs the memory device 120c to authenticate access to the band 0 on the basis of the received password for setting the band 0.

In S225, when the memory device 120c receives the password (transmitted in S224) for setting the band 0, the memory device 120c authenticates access to the band 0 on the basis of the received password for setting the band 0 and transmits the result of the authentication to the controller 110a.

In this case, it is assumed that the memory device 120c successfully authenticates access to the band 0 on the basis of the password for setting the band 0. The memory device 120c notifies, on the basis of the result of the authentication, the controller 110a that the memory device 120c successfully authenticates access to the band 0 on the basis of the password for setting the band 0.

In S226, the controller 110a enables the band 0 set in the storage region 121 of the memory device 120c to be accessed by the host computer 300.

Thus, the host computer 300 that is used by the user may read, from the region of the band 0 set in the storage region 121, data stored before the disconnection and may write data in the band 0.

In the RAID device 100 according to the second embodiment, an SED is used. During an operation of the RAID device 100, the band 0 set in the storage region 121 is used for reading and writing data. When the memory device 120c needs to be disconnected, the band 1 is set in a region in and from which data is written and read. Thus, even when the memory device 120c is disconnected from the RAID device 100, it is possible to prevent data from leaking and being stolen while suppressing an increase in the amount of manual labor and an increase in the cost.

If the authentication is successfully performed on the basis of the password for setting the band 1, the band 1 is released. If the authentication is successfully performed on the basis of the password for setting the band 0, the band 0 may be accessed. Thus, data that is stored in the memory device 120c may be protected from unauthorized access by the two-factor authentication using the passwords.

In addition, the encryption key that is used to encrypt data to be stored in the band 0 is different from the encryption key that is used to encrypt data to be stored in the band 1. Thus, even if a third party acquires the password for setting the band 0 in an unauthorized manner and accesses the band 0 of the memory device 120c, data is encrypted using the encryption key for the band 1 and stored, and whereby it is possible to prevent the data from leaking and being stolen.

Third Embodiment

Next, a third embodiment is described below. Differences between the second embodiment and the third embodiment are mainly described. Items that are the same as the items described in the second embodiment are indicated by the same references numerals in the third embodiment, and a description thereof is omitted.

In the present embodiment, the SED is used. When a memory device needs to be disconnected, a password for setting the band 1 is randomly generated, the band 1 is set in a region in and from which data is written and read, and the generated password for setting the band 1 is erased from a RAID device according to the present embodiment.

In addition, in order to reconnect the memory device, procedures of the encryption/erasure using the erase master are provided, the password for setting the band 1 is initialized by the encryption/erasure, and whereby the band 1 may be released using the initialized password for setting the band 1.

Figure 12:
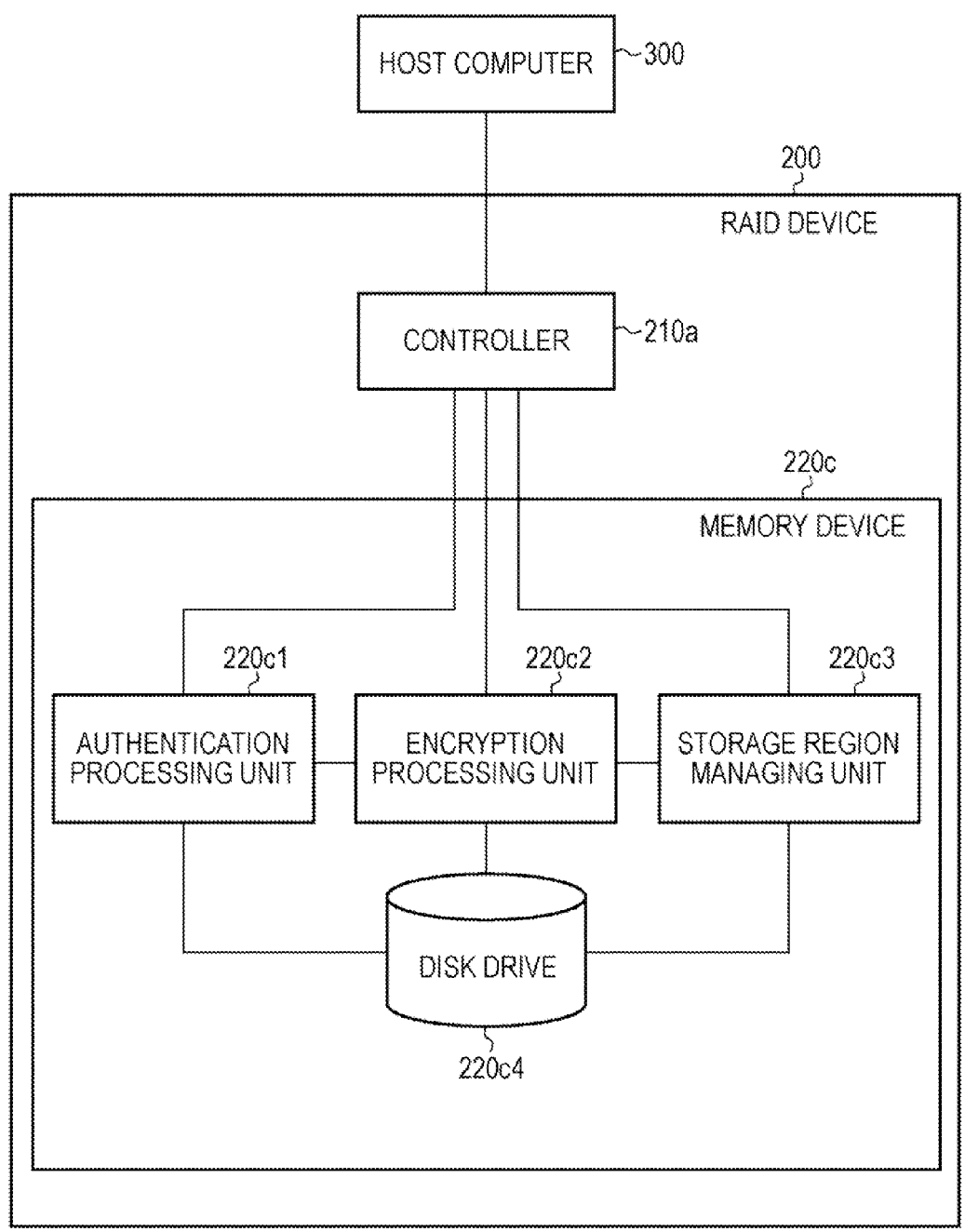
FIG. 12 is a block diagram illustrating functions of a RAID device according to a third embodiment.

FIG. 12 is a block diagram illustrating functions of the RAID device according to the third embodiment. The RAID device 200 according to the third embodiment has a RAID constituted by a plurality of memory devices in the same manner as the RAID device 100 according to the second embodiment. The RAID device 200 is connected to the host computer 300 through a communication line.

The RAID device 200 stores data transmitted from the host computer 300 in the RAID constituted by a memory device 220c and the like. The RAID device 200 reads data stored in the RAID in accordance with a request provided from the host computer 300, and transmits the read data to the host computer 300. The RAID device 200 includes a controller 210a and the memory device 220c.

The memory device 220c includes an authentication processing unit 220c1, an encryption processing unit 220c2, a storage region managing unit 220c3 and a disk drive 220c4.

The memory device 220c and another memory device form the RAID in the same manner as the second embodiment.

The memory device 220c is described below. However, the other memory device that is included in the RAID device 200 has the same configuration as the memory device 220c, and a description thereof is omitted.

If the memory device 220c that is disconnected from the RAID device 200 needs to be reconnected to the RAID device 200, and the authentication processing unit 220c1 successfully performs the authentication on the basis of the erase master, the controller 210a causes the storage region managing unit 220c3 to erase the password for setting the band 1 and set a new password for setting the band 1, and causes the authentication processing unit 220c1 to perform authentication on the basis of the newly set password for setting the band 1. The erase master is an example of a third password. The password for setting the band 1 is an example of the second password.

If the authentication processing unit 220c1 successfully performs the authentication on the basis of the new password for setting the band 1, the controller 210a causes the storage region managing unit 220c3 to release the band 1 set in the storage region and set the band 0, and causes the authentication processing unit 220c1 to perform authentication on the basis of the password (transmitted from the host computer 300) for setting the band 0. The password for setting the band 0 is an example of the first password.

If the authentication processing unit 220c1 successfully performs the authentication on the basis of the password for setting the band 0, the controller 210a causes the storage region managing unit 220c3 to enable the band 0 set in the storage region to be accessed.

When the memory device 220c is disconnected from the RAID device 200 and reconnected to the same RAID device 200 or connected to another RAID device, and the disk drive 220c4 needs to be accessed, it is needed to perform the encryption/erasure and enable the band 0 to be accessed. Thus, the memory device 220c is protected by the two-factor authentication using the password for setting the band 0 and the erase master.

When the disconnected memory device 220c needs to be reconnected to the RAID device 200, the authentication processing unit 220c1 performs authentication on the basis of the password for setting the band 0, the password for setting the band 1 and the erase master so as to permit or deny access. Thus, the RAID device 200 prevents unauthorized access to the disk drive 220c4.

The encryption processing unit 220c2 encrypts data that has been transmitted from the host computer 300 and is to be written in the disk drive 220c4. In addition, the encryption processing unit 220c2 decrypts the encrypted data to be read in accordance with a request provided from the host computer 300.

The storage region managing unit 220c3 may set either the band 0 or the band 1 in the storage region that is included in the disk drive 220c4.

If the authentication processing unit 220c1 successfully performs access authentication on the basis of the password for setting the band 0, the band 0 may be accessed, and the encryption processing unit 220c2 encrypts data using the encryption key for the band 0. The band 0 is used to read and write data between the host computer 300 and the memory device 220c.

If the authentication processing unit 220c1 successfully performs access authentication on the basis of the password for setting the band 1, the band 1 may be released, and the encryption processing unit 220c2 encrypts data using the encryption key for the band 1.

The storage region managing unit 220c3 may set the band 0 in a part of the storage region included in the disk drive 220c4 and set the band 1 in another part of the storage region. The storage region managing unit 220c3 may exclusively set either the band 0 or the band 1 in a single part of the storage region.

The encryption key for the band 0 is an example of the first encryption key. The encryption key for the band 1 is an example of the second encryption key.

The disk drive 220c4 stores data that is transmitted and received between the memory device 220c and the host computer 300. The disk drive 220c4 is an HDD.

Figure 13:
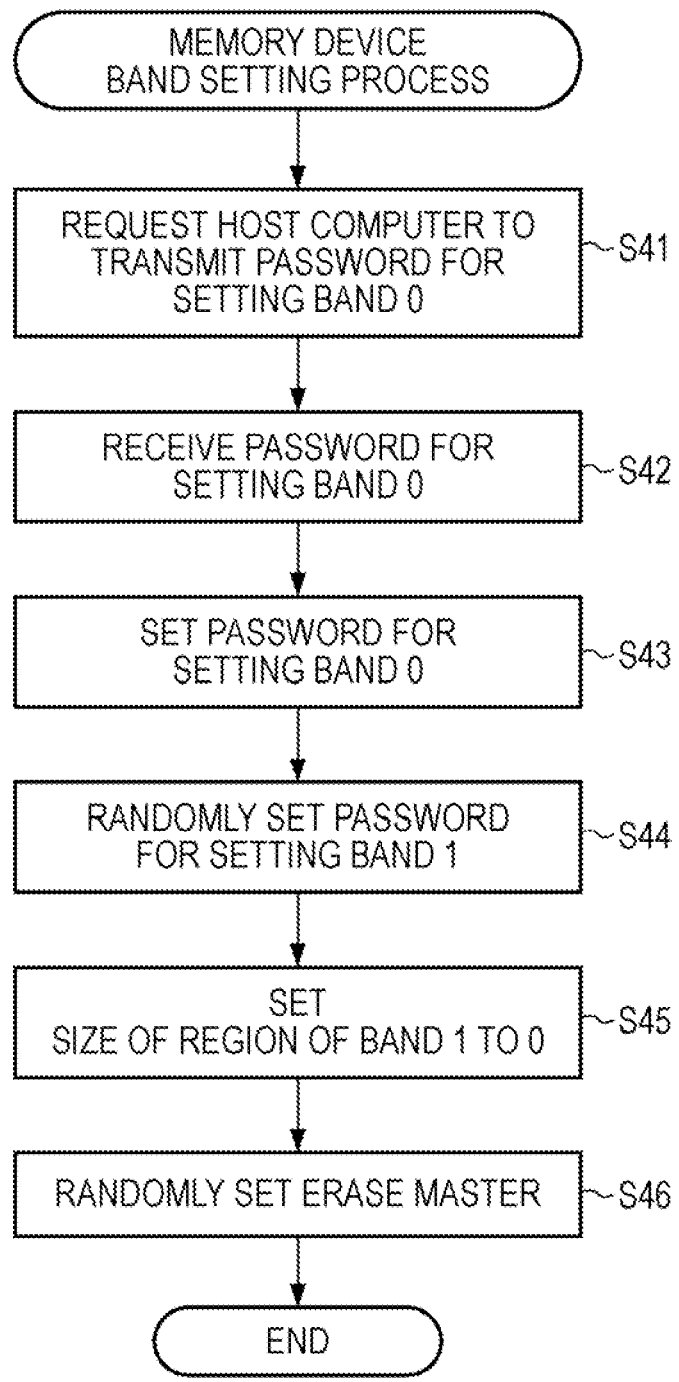
FIG. 13 is a flowchart of procedures of a memory device band setting process according to the third embodiment.

FIG. 13 is a flowchart of procedures of a memory device band setting process according to the third embodiment. The RAID device 200 according to the present embodiment performs the memory device band setting process by setting the passwords for setting the bands 0 and 1 and setting the band 0 in the storage region 121 when the memory device 220 needs to be connected or needs to start to be used before writing of data in the storage region of the storage device 220c. The memory device band setting process illustrated in FIG. 13 is described below with reference to operation numbers of the flowchart illustrated in FIG. 13.

In S41, the controller 210a requests the host computer 300 to transmit the password for setting the band 0. The user enters the password for setting the band 0 in the host computer 300. The host computer 300 transmits the entered password for setting the band 0 to the RAID device 200.

In S42, the controller 210a receives the password (transmitted by the host computer 300) for setting the band 0.

In S43, the controller 210a sets the received password for setting the band 0.

In S44, the controller 210a randomly generates a password for setting the band 1 and sets the generated password for setting the band 1.

In S45, the controller 210a sets the size of the region of the band 1 to 0. Thus, the band 0 is set in all the regions of the storage region in the memory device 220c. All data to be written in the memory device 220c is stored in the band 0.

In S46, the controller 210a randomly generates an erase master and sets the generated erase master.

Figure 14:
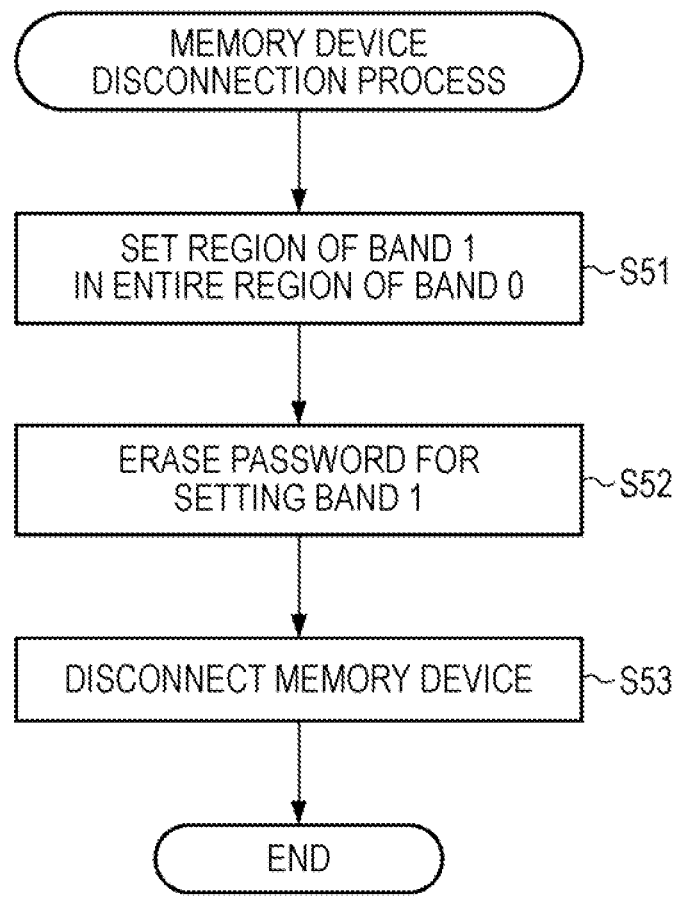
FIG. 14 is a flowchart of procedures of a memory device disconnection process according to the third embodiment.

FIG. 14 is a flowchart of procedures of a memory device disconnection process according to the present embodiment. If the RAID device 200 according to the present embodiment detects an abnormality of the memory device 220c, the RAID device 200 performs the memory device disconnection process. The memory device disconnection process illustrated in FIG. 14 is described below with reference to operation numbers of the flowchart illustrated in FIG. 14.

In S51, the controller 210a sets the region of the band 1 in the entire region of the band 0. Thus, the band 1 is set in all the regions of the storage region.

In S52, the controller 210a erases the password (stored in a cache memory included in the controller 210a) for setting the band 1.

In S53, the controller 210a performs the process of disconnecting the memory device 220c. Thus, the memory device 220c is disconnected from the RAID device 200.

Figure 15:
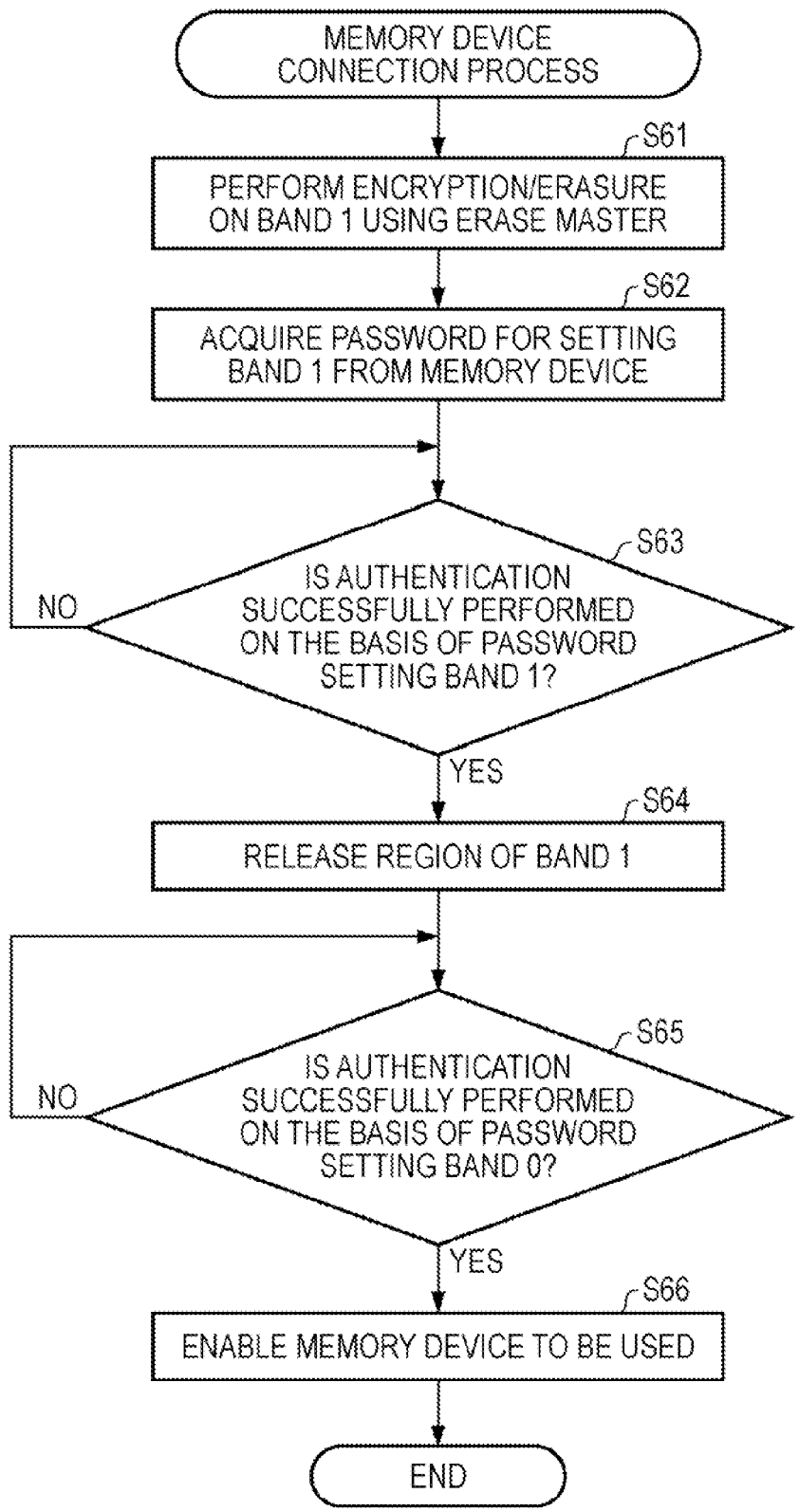
FIG. 15 is a flowchart of procedures of a memory device connection process according to the third embodiment.

FIG. 15 is a flowchart of procedures of a memory device connection process according to the third embodiment. When the user attaches the disconnected memory device 220c to the RAID device 200 according to the present embodiment and the memory device 220c needs to be reconnected to the RAID device 200, the RAID device 200 authenticates the user on the basis of the password for setting the band 1, releases the region of the band 1, and sets the band 0. In addition, the RAID device 200 authenticates the user on the basis of the password for setting the band 0, and performs the memory device connection process (of connecting the memory device 220c) so that the storage region of the memory device 220c may be used.

The memory device connection process illustrated in FIG. 15 is described below with reference to operation numbers of the flowchart illustrated in FIG. 15.

In S61, the controller 210a performs the encryption/erasure on the storage region of the memory device 220c using the erase master. Thus, the password for setting the band 1 of the storage region is initialized. Therefore, access to the band 1 may be successfully authenticated on the basis of the initialized password for the setting the band 1.

In S62, the controller 210a acquires the initialized password for setting the band 1. The initialized password for setting the band 1 may be described in a manual of the memory device 220c, described on an outer portion of a chassis, or described on an attached seal, and the user may enter the initialized password for setting the band 1 in the host computer 300.

In addition, the initialized password for setting the band 1 may be acquired by accessing a server provided by the vendor or the like through the Internet.

In S63, the controller 210a causes the authentication processing unit 220c1 to authenticate the user on the basis of the password (acquired in S62) for setting the band 1.

If the authentication processing unit 220c2 successfully authenticates the user on the basis of the password for setting the band 1 (Yes in S63), the process proceeds to operation S64. On the other hand, if the authentication processing unit 220c2 does not successfully authenticate the user on the basis of the password for setting the band 1 (No in S63), the authentication process of operation S63 is repeated.

In S64, the controller 210a causes the storage region managing unit 220c3 to release the region of the band 1. Thus, the band 0 is set in the region in which the band 1 has been previously set.

In S65, the controller 210a requests the host computer 300 to transmit the password for setting the band 0 and causes the authentication processing unit 220c1 to authenticate the user on the basis of the password transmitted from the host computer 300.

If the authentication processing unit 220c2 successfully authenticates the user on the basis of the password for setting the band 1 (Yes in S65), the process proceeds to operation S66.

On the other hand, if the authentication processing unit 220c2 does not successfully authenticate the user on the basis of the password for setting the band 1 (No in S65), the authentication process of operation S65 is repeated.

In S66, the controller 210a causes the storage region managing unit 220c3 to enable the memory device 220c to be used by the RAID device 200.

Thus, the host computer 300 may read data stored in the region of the band 0 and write data in the region of the band 0.

Figure 16:
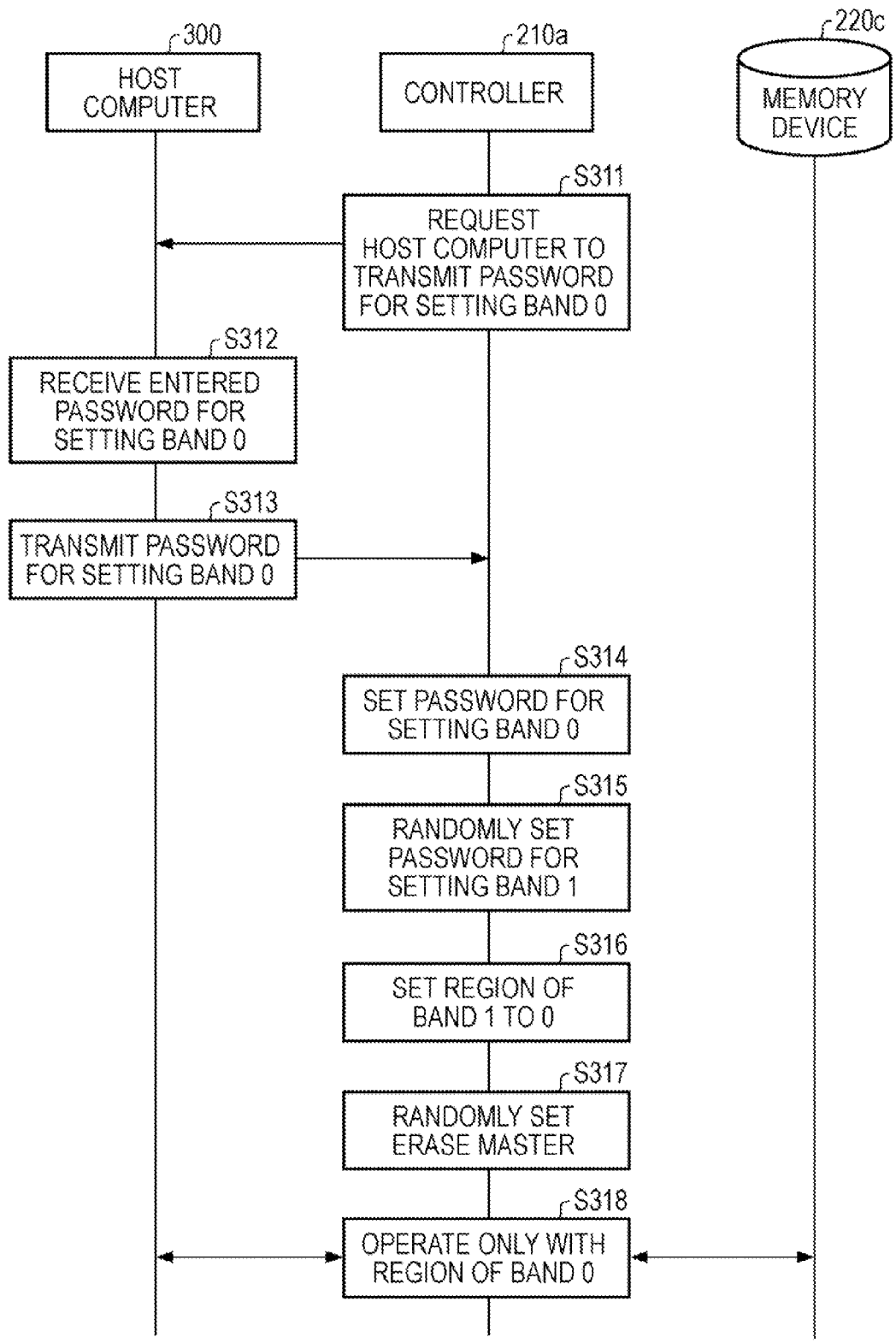
FIG. 16 is a sequence diagram illustrating procedures of a process that is performed to set a band of a memory device in the RAID device according to the third embodiment.

FIG. 16 is a sequence diagram illustrating procedures of a process that is performed to set a band of the memory device in the RAID device according to the third embodiment, while FIG. 17 is a sequence diagram illustrating procedures of a process that is performed to disconnect the memory device from the RAID device according to the third embodiment.

The RAID device 200 according to the present embodiment receives the password for setting the band 0 and the password for setting the band 1 from the host computer 300.

Next, the RAID device 200 sets the received passwords and sets the band 0 in all the regions of the storage region of the memory device 220c so that the band 0 is used to read and write data.

If an abnormality is detected in the memory device 220c during an operation of the RAID device 200, the band 1 is set in the region of the band 0 that is used to read and write data, and the memory device 220c is disconnected from the RAID device 200 after the setting of the band 1.

The process that is performed to set the band of the memory device in the present embodiment is described below with reference to FIG. 16. The process that is performed to disconnect the memory device in the present embodiment is described below with reference to FIG. 17.

First, the process of operations S311 to S316 in which the password for setting the band 0 and the password for setting the band 1 are set and the band 0 is set in the storage region is described below.

In S311, the controller 210a requests the host computer 300 to transmit the password for setting the band 0 in the storage region of the memory device 220c.

In S312, the host computer 300 displays the password setting screen on the monitor connected to the host computer 300, for example, and receives the password (entered by the user) for setting the band 0 in accordance with the request provided in S311.

In S313, the host computer 300 transmits the password (received in S312) for setting the band 0 to the controller 210a of the RAID device 200.

In S314, when the controller 210a receives the password (transmitted in S313) for setting the band 0, the controller 210a sets the received password for setting the band 0 as the password for setting the band 0 of the storage region.

In S315, the controller 210a randomly generates a password for setting the band 1 and sets the generated password for setting the band 1.

In S316, the controller 210a sets the region of the band 1 of the storage region to 0. In other words, the controller 210a sets the band 0 in all the regions of the storage region.

In S317, the controller 210a randomly generates an erase master and sets the generated erase master.

In S318, the controller 210a operates with the band 0 set in the storage region 121 for reading and writing user data of the host computer 300. Specifically, when the host computer 300 transmits data (to be written) to the RAID device 200, the controller 210a writes the data in the band 0 set in the storage region 121 in S316.

When the host computer 300 transmits a request to read data to the RAID device 200, the controller 210a reads the data from the band 0 set in the storage region in S316 in accordance with the request and transmits the read data to the host computer 300.

Next, the process of operations S321 to S326 is described below. In the process of operations S321 to S326, an abnormality occurs in a memory device (for example, memory device 220c) included in the RAID device 200, the controller 210a detects the abnormality of the memory device 220c, and the memory device 220c is disconnected from the RAID device 200.

In S321, an abnormality occurs in the memory device 220c.

In S322, the controller 210a detects the abnormality that occurs in the memory device 220c.

In S323, the controller 210a sets the band 1 in the entire storage region of the memory device 220c.

In S324, the controller 210a erases the password (stored in the cache memory included in the controller 210a) for setting the band 1.

In S325, the controller 210a instructs the memory device 220c to be disconnected from the RAID device 200.

In S326, the memory device 220c is disconnected from the RAID device 200.

FIGS. 18 and 19 are sequence diagrams illustrating a process that is performed to connect the memory device to the RAID device according to the third embodiment. If the memory device (for example, memory device 220c) that is disconnected from the RAID device 200 owing to the occurrence of the abnormality needs to be reconnected to the RAID device 200 according to the present embodiment, and the authentication is successfully performed on the basis of the password for setting the band 0 and the password for setting the band 1, data may be read from and written in the storage region. The process that is performed to connect the memory device is described below with reference to FIGS. 18 and 19.

In S411, the controller 210a causes the memory device 220c to use the erase master and perform the encryption/erasure on the storage region of the memory device 220c.

Thus, the password for setting the band 1 that is set in the storage region is initialized, and the encryption key for the band 1 is changed.

In S412, the controller 210a requests the memory device 220c to transmit the initialized password for setting the band 1.

In S413, the memory device 220c transmits the initialized password for setting the band 1 to the controller 210a.

In S414, when the controller 210a receives the initialized password (transmitted in S413) for setting the band 1, the controller 210a transmits the received initialized password for setting the band 1 to the memory device 220c and instructs the memory device 220c to authenticate access to the band 1 on the basis of the initialized password for setting the band 1.

In S415, when the memory device 220c receives the initialized password (transmitted in S414) for setting the band 1, the memory device 220c authenticates access to the band 1 on the basis of the received initialized password for setting the band 1 and transmits the result of the authentication to the controller 210a. In this case, it is assumed that the memory device 220c successfully authenticates access to the band 1 on the basis of the received initialized password for setting the band 1. The memory device 220c notifies, on the basis of the result of the authentication, the controller 210a that the memory device 220c successfully authenticates access to the band 1 on the basis of the received initialized password for setting the band 1.

In S416, the controller 210a releases the region of the band 1 set in the storage region of the memory device 220c. Thus, the band 0 is set in the region in which the band 1 has been previously set.

In S421, the controller 210a requests the host computer 300 to transmit the password for setting the band 0 in order to authenticate access to the band 0 set in the storage region of the memory device 220c.

In S422, the host computer 300 receives the password (entered by the user) for setting the band 0 in accordance with the request provided in S421.

In S423, the host computer 300 transmits the password (received in S422) for setting the band 0 to the controller 210a.

In S424, when the controller 210a receives the password (transmitted in S423) for setting the band 0, the controller 210a transmits the received password for setting the band 0 to the memory device 220c and instructs the memory device 220c to authenticate access to the band 0 on the basis of the password (transmitted to the memory device 220c) for setting the band 0.

In S425, when the memory device 220c receives the password (transmitted in S424) for setting the band 0, the memory device 220c authenticates access to the band 0 on the basis of the password for setting the band 0 and transmits the result of the authentication to the controller 210a. In this case, it is assumed that the memory device 220c successfully authenticates access to the band 0 on the basis of the password for setting the band 0. The memory device 220c notifies, on the basis of the result of the authentication, the controller 210a that the memory device 220c successfully authenticates access to the band 0 on the basis of the password for setting the band 0.

In S426, the controller 210a enables the region of the band 0 set in the storage region of the memory device 220c to be accessed by the host computer 300. Thus, the host computer 300 that is used by the user may read data stored before the disconnection of the memory device 220c and write data in the region of the band 0.

In the RAID device 200 according to the third embodiment, the SED is used, and the band 0 that is set in the storage region is used to read and write data during an operation of the RAID device 200. When the memory device 220c needs to be disconnected, the RAID device 200 randomly generates a password for setting the band 1 and sets the band 1 in a region in and from which data is written and read. In addition, the RAID device 200 erases the generated password for setting the band 1 from the RAID device 200.

When the memory device 220c needs to be reconnected to the RAID device 220, the procedures of the encryption/erasure using the erase master are provided, the password for setting the band 1 is initialized by the encryption/erasure, and the band 1 may be released using the initialized password for setting the band 1.

If the authentication is successfully performed on the basis of both erase master and password for setting the band 0, data that is stored in the memory device 220c may be accessed. Thus, even when the memory device 220c is disconnected from the RAID device 200, it is possible to prevent the data from leaking and being stolen while suppressing an increase in the amount of manual labor and an increase in the cost.

If the authentication is successfully performed on the basis of the erase master, the password for setting the band 1 is initialized by the encryption/erasure, and data may be accessed using the initialized password for setting the band 1. After that, if the authentication is successfully performed on the basis of the password for setting the band 0, the band 0 may be accessed. Thus, data that is stored in the memory device 220c may be protected by the two-factor authentication using the two passwords.

In addition, the encryption key that is used to encrypt data to be stored in the band 0 is different from the encryption key that is used to encrypt data to be stored in the band 1. Even if the third party acquires the password for setting the band 0 in an unauthorized manner and accesses the band 0 of the memory device 220c, data is encrypted using the encryption key for the band 1 and stored. Thus, it is possible to prevent the data from leaking and being stolen.

The storage device disclosed herein, the memory device disclosed herein, the control device disclosed herein, and the method (disclosed herein) for controlling the memory device, are described above. The configurations of the parts may be replaced with arbitrary configurations so that the parts have the same functions. In addition, other arbitrary constituent elements and other arbitrary processes may be added to the technique disclosed herein. In addition, the technique disclosed herein may be configured by combining any two or more of the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device connected to a host, the storage device comprising:
    a storage unit configured to write encrypted data in and read the encrypted data from a storage medium that stores the encrypted data, the storage unit including:
    an encryption processing unit that encrypts data from a host and decrypts the encrypted data from the storage medium,
    an authentication processing unit configured to perform an authentication process using a first password set to a first band on the storage medium, a second password set to a second band on the storage medium, the first and second bands being virtual storage areas set to the storage medium, and
    a storage region managing unit configured to set the first band and the second band to the storage medium, the first band being remaining virtual storage areas other than the second band, a range of the first band being all of the virtual storage areas of the storage medium when a range of the second band is set to zero, a range of the first band being set to zero when a range of the second band is set to all of the virtual storage areas of the storage medium, the first band being enabled to be accessed and used to perform data reading and data writing between the host and the storage unit when the authentication processing unit successfully performs access authentication based on a first password, a range of the second band being set to zero to be released when the authentication processing unit successfully performs access authentication based on the second password, and
    a controller configured to control the storage unit in accordance with a request provided from the host,
wherein the controller performs a disconnecting process of the storage unit, the disconnection process including:
    instructing the storage region management unit to set the second band to same virtual storage areas as the first band to release the first band when the first band is set on all of the virtual storage areas set to the storage medium, and
    instructing the storage region management unit to disconnect the storage unit from the controller,
wherein,
    the authentication processing unit configured to perform an authentication process using a third password and a fourth password set to the second band, and
    the storage region managing unit configure to erase the second password to set the fourth password for the second band when the authentication processing unit successfully performs access authentication based on the third password, a size of the second band being set to zero to be release when the authentication processing unit successfully performs access authentication based on the fourth password, the first band being enabled to be accessed and used to perform data reading and data writing between the host and the storage unit when the authentication processing unit successfully performs access authentication based on the first password after the second band is released,
wherein the controller performs a re-connection process of the storage unit after the disconnection process, the re-connection process including:
    instructing the storage unit to authenticate the third password,
    instructing the storage unit to erase the second password and set a new password for the second band when receiving a notification of an authentication success of the third password from the storage unit,
    requesting the storage unit to transmit the new password for the second band,
    instructing the storage unit to authenticate the fourth password when receiving the fourth password as the new password from the storage unit,
    instructing the storage unit to release the second band when receiving a notification of authentication success of the fourth password from the storage unit,
    requesting a first password for the first band to the host,
    instructing the storage unit to authenticate the first password from the host when receiving the first password from the host, and
    enabling the storage unit to be accessed by the host when receiving a notification of authentication success of the first password received from the host.

* * * * *